United States Patent
Kuriyama et al.

(10) Patent No.: US 12,481,851 B2
(45) Date of Patent: Nov. 25, 2025

(54) PRINTING APPARATUS AND IDENTIFICATION METHOD

(71) Applicant: CANON KABUSHIKI KAISHA, Tokyo (JP)

(72) Inventors: Keiji Kuriyama, Saitama (JP); Hidehiko Kanda, Kanagawa (JP); Satoshi Wada, Tokyo (JP); Fumihiro Goto, Kanagawa (JP); Hajime Nagai, Kanagawa (JP); Shingo Nishioka, Kanagawa (JP); Shin Genta, Kanagawa (JP); Serena Yoshikawa, Kanagawa (JP)

(73) Assignee: Canon Kabushiki Kaisha, Tokyo (JP)

(*) Notice: Subject to any disclaimer, the term of this patent is extended or adjusted under 35 U.S.C. 154(b) by 186 days.

(21) Appl. No.: 18/538,302

(22) Filed: Dec. 13, 2023

(65) Prior Publication Data

US 2024/0202478 A1   Jun. 20, 2024

(30) Foreign Application Priority Data

Dec. 20, 2022   (JP) .................................. 2022-203761
Sep. 13, 2023   (JP) .................................. 2023-148304

(51) Int. Cl.
  *G06K 15/02*    (2006.01)
  *B41J 2/125*    (2006.01)
  *G06K 15/10*    (2006.01)

(52) U.S. Cl.
  CPC ............ *G06K 15/021* (2013.01); *B41J 2/125* (2013.01); *G06K 15/027* (2013.01); *G06K 15/105* (2013.01)

(58) Field of Classification Search
  CPC .. G06K 15/021; G06K 15/027; G06K 15/105; B41J 2/125; B41J 2/1714; B41J 2/2114; B41J 11/0022; B41J 11/0024
  See application file for complete search history.

(56) References Cited

U.S. PATENT DOCUMENTS

| | | | |
|---|---|---|---|
| 6,260,938 B1 * | 7/2001 | Ohtsuka | B41J 2/04563 347/14 |
| 7,237,871 B2 | 7/2007 | Yamaguchi | |
| 7,278,700 B2 | 10/2007 | Yamaguchi | |
| 7,290,855 B2 | 11/2007 | Chikuma | |
| 7,296,872 B2 | 11/2007 | Hayashi | |
| 7,296,877 B2 | 11/2007 | Chikuma | |
| 7,315,393 B2 | 1/2008 | Kanda | |

(Continued)

FOREIGN PATENT DOCUMENTS

JP   2018-149735 A   9/2018

*Primary Examiner* — Bradley W Thies
(74) *Attorney, Agent, or Firm* — Venable LLP

(57) ABSTRACT

To print high-definition images, an embodiment of the present invention provides a printing apparatus including: a printing unit configured to print an image on a printing medium by applying a first liquid containing a colorant and a second liquid containing a component that causes the colorant to aggregate; a control unit configured to control the printing unit so as to print a first pattern and a second pattern differing from the first pattern in a manner of application of the first liquid and the second liquid; and an identification unit configured to identify a characteristic of the printing medium based on a first density of the first pattern and a second density of the second pattern.

29 Claims, 30 Drawing Sheets

(56) References Cited

U.S. PATENT DOCUMENTS

| | | |
|---|---|---|
| 7,325,900 B2 | 2/2008 | Hayashi |
| 7,344,219 B2 | 3/2008 | Sakamoto |
| 7,380,896 B2 | 6/2008 | Wada |
| 7,399,049 B2 | 7/2008 | Jahana |
| 7,431,426 B2 | 10/2008 | Yamaguchi |
| 7,533,962 B2 | 5/2009 | Masuyama |
| 7,552,996 B2 | 6/2009 | Ochiai |
| 7,585,039 B2 | 9/2009 | Ochiai |
| 7,706,023 B2 | 4/2010 | Kanda |
| 7,726,763 B2 | 6/2010 | Ochiai |
| 7,758,153 B2 | 7/2010 | Tanaka |
| 7,762,640 B2 | 7/2010 | Kanda |
| 7,773,244 B2 | 8/2010 | Yano |
| 7,782,350 B2 | 8/2010 | Tanaka |
| 7,798,593 B2 | 9/2010 | Nitta |
| 7,880,910 B2 | 2/2011 | Aichi |
| 7,963,623 B2 | 6/2011 | Ochiai |
| 7,980,672 B2 | 7/2011 | Umezawa |
| 8,174,711 B2 | 5/2012 | Yano |
| 8,210,638 B2 | 7/2012 | Wada |
| 8,251,473 B2 | 8/2012 | Moriyama |
| 8,384,944 B2 | 2/2013 | Kawatoko |
| 8,454,110 B2 | 6/2013 | Ochiai |
| 8,622,501 B2 | 1/2014 | Komamiya |
| 8,636,334 B2 | 1/2014 | Nishioka |
| 8,888,223 B2 | 11/2014 | Oonuki |
| RE45,265 E | 12/2014 | Yano |
| 9,039,120 B2 | 5/2015 | Nishioka |
| 9,044,947 B2 | 6/2015 | Wada |
| 9,308,741 B2 | 4/2016 | Wada |
| 9,340,050 B2 | 5/2016 | Otani |
| 9,415,602 B2 | 8/2016 | Takeuchi |
| 9,545,791 B2 | 1/2017 | Oonuki |
| 9,573,381 B2 | 2/2017 | Kanda |
| 9,656,459 B2 | 5/2017 | Kuwabara |
| 9,889,649 B2 | 2/2018 | Baba |
| 10,500,841 B2 | 12/2019 | Nishitani |
| 10,668,717 B2 | 6/2020 | Azuma |
| 10,688,820 B2 | 6/2020 | Ushiyama |
| 10,759,193 B2 | 9/2020 | Goto |
| 11,077,687 B2 | 8/2021 | Nishioka |
| 11,383,536 B2 | 7/2022 | Genta |
| 11,794,495 B2 | 10/2023 | Kato |
| 11,813,853 B2 | 11/2023 | Kawafuji |
| 11,840,079 B2 | 12/2023 | Kuriyama |
| 11,840,101 B2 | 12/2023 | Ushiyama |
| 2018/0257417 A1 | 9/2018 | Ushiyama |
| 2022/0324223 A1 | 10/2022 | Nagai |
| 2023/0001721 A1 | 1/2023 | Kanda |

* cited by examiner

PRINTING MEDIUM SETTING

TYPE OF PRINTING MEDIUM

| VINYL CHLORIDE FILM ▽ |
| --- |
| VINYL CHLORIDE BANNER |
| PP FILM |
| YUPO |
| PLAIN PAPER |
| GLOSSY PAPER |
| ART PAPER |
| COATED PAPER |
| WALLPAPER |
| A: EASILY WETTABLE/NON-ABSORBENT PRINTING MEDIUM |
| ⋮ |

FIG.7

| TYPE OF PRINTING MEDIUM | AMOUNT OF REACTION LIQUID TO BE APPLIED (%) | AIR BLOW DURING PRINTING | MASK |
|---|---|---|---|
| VINYL CHLORIDE FILM | 40 | OFF | A |
| VINYL CHLORIDE BANNER | 40 | OFF | A |
| PP FILM | 40 | OFF | A |
| YUPO | 70 | ON | B |
| WALLPAPER | 0 | ON | B |
| PLAIN PAPER | 0 | ON | B |
| GLOSSY PAPER | 0 | OFF | B |
| ART PAPER | 70 | ON | B |
| COATED PAPER | 40 | ON | A |
| A: EASILY WETTABLE/NON-ABSORBENT PRINTING MEDIUM | 70 | OFF | A |
| B: POORLY WETTABLE/NON-ABSORBENT PRINTING MEDIUM | 70 | ON | B |
| C: EASILY WETTABLE/POORLY ABSORBENT PRINTING MEDIUM | 40 | ON | B |
| D: POORLY WETTABLE/POORLY ABSORBENT PRINTING MEDIUM | | | |
| · | | | |
| · | | | |

| TYPE OF PRINTING MEDIUM | PRINTING CONDITIONS | | MASK | PRINTING MEDIUM CHARACTERISTICS | |
|---|---|---|---|---|---|
| | AMOUNT OF REACTION LIQUID TO BE APPLIED (%) | AIR BLOW DURING PRINTING | | WETTABILITY FLAG | ABSORBENCY FLAG |
| VINYL CHLORIDE FILM | 40 | OFF | A | 0 | 0 |
| VINYL CHLORIDE BANNER | 40 | OFF | A | 0 | 0 |
| PP FILM | 40 | OFF | A | 0 | 0 |
| YUPO | 70 | ON | B | 1 | 0 |
| WALLPAPER | 70 | ON | B | 1 | 1 |
| PLAIN PAPER | 0 | ON | B | 0 | 1 |
| GLOSSY PAPER | 0 | OFF | B | 0 | 2 |
| ART PAPER | 0 | ON | B | 0 | 2 |
| COATED PAPER | 0 | ON | B | 0 | 2 |

FIG.23B

| TYPE OF PRINTING MEDIUM | PRINTING CONDITIONS | | MASK | PRINTING MEDIUM CHARACTERISTICS | |
|---|---|---|---|---|---|
| | AMOUNT OF REACTION LIQUID TO BE APPLIED (%) | AIR BLOW DURING PRINTING | | WETTABILITY FLAG | ABSORBENCY FLAG |
| A: EASILY WETTABLE/NON-ABSORBENT PRINTING MEDIUM | 70 | ON | A | 1 | 0 |
| B: POORLY WETTABLE/NON-ABSORBENT PRINTING MEDIUM | 40 | OFF | A | 0 | 0 |
| C: EASILY WETTABLE/POORLY ABSORBENT PRINTING MEDIUM | 70 | ON | B | 1 | 1 |
| D: POORLY WETTABLE/POORLY ABSORBENT PRINTING MEDIUM | 40 | ON | B | 0 | 1 |

| PRINTING MEDIUM CHARACTERISTICS | | PRINTING CONDITIONS | | |
|---|---|---|---|---|
| WETTABILITY | ABSORBENCY | AMOUNT OF REACTION LIQUID TO BE APPLIED (%) | AIR BLOW DURING PRINTING | MASK |
| EASILY WETTABLE | NON-ABSORBENT | 70 | MIDDLE | A |
| POORLY WETTABLE | NON-ABSORBENT | 40 | OFF | A |
| EASILY WETTABLE | POORLY ABSORBENT | 70 | MIDDLE | B |
| POORLY WETTABLE | POORLY ABSORBENT | 40 | MIDDLE | B |

| PRINTING MEDIUM NAME | RESULT OF PRINTING MEDIUM IDENTIFICATION | PRINTING CONDITIONS (RECOMMENDED) | | |
|---|---|---|---|---|
| | | AMOUNT OF REACTION LIQUID TO BE APPLIED (%) | AIR BLOW DURING PRINTING | MASK |
| A | EASILY WETTABLE/NON-ABSORBENT PRINTING MEDIUM | 70 | MIDDLE | A |

FIG.28B

| PRINTING MEDIUM NAME | RESULT OF PRINTING MEDIUM IDENTIFICATION | PRINTING CONDITIONS (RECOMMENDED) | | |
|---|---|---|---|---|
| | | AMOUNT OF REACTION LIQUID TO BE APPLIED (%) | AIR BLOW DURING PRINTING | MASK |
| A | EASILY WETTABLE/NON-ABSORBENT PRINTING MEDIUM | 90 | HIGH | A |

PRINTING APPARATUS AND IDENTIFICATION METHOD

BACKGROUND

Field

The present disclosure relates to a printing apparatus and a printing medium identification method and specifically to a technology for identifying an ink fixation characteristic of a printing medium.

Description of the Related Art

Ink fixation characteristics of printing media include ink wettability and absorbency of the printing media. Japanese Patent Laid-Open No. 2018-149735 discloses a technique which involves identifying the type of a printing medium to be used in printing, and performing the printing with a reaction liquid that reacts with the colorants of inks to cause aggregation in a case where the printing medium is one with low absorbency whereas performing the printing without the reaction liquid in a case where the printing medium is one with high absorbency. In this way, it is possible to promote the ink fixation with the reaction liquid even in a case of using a printing medium with low absorbency.

SUMMARY

With Japanese Patent Laid-Open No. 2018-149735, however, appropriate printing conditions cannot sometimes be set in a case of using a printing medium with unknown ink fixation characteristics. For example, the user of a printer may use a printing medium that does not absorb inks, such as a polypropylene film, for water resistance, light fastness, and the like of printed images. In this case, the user may use a printing medium other than the genuine printing media designed for the printer. The ink fixation characteristics of such a printing medium are unknown, making it impossible to set appropriate printing conditions for the printing medium. This results in poor ink fixation and lowers the definition of the printed image.

The present disclosure has been made in view of the above problem, and an object thereof is to provide a printing apparatus and a printing medium identification method which enable printing of a high-definition image even in a case of performing printing using a printing medium with unknown ink fixation characteristics.

An embodiment of the present invention is a printing apparatus including: a printing unit configured to print an image on a printing medium by applying a first liquid containing a colorant and a second liquid containing a component that causes the colorant to aggregate; a control unit configured to control the printing unit so as to print a first pattern and a second pattern differing from the first pattern in a manner of application of the first liquid and the second liquid; and an identification unit configured to identify a characteristic of the printing medium based on a first density of the first pattern and a second density of the second pattern.

Further features of the present invention will become apparent from the following description of exemplary embodiments with reference to the attached drawings.

BRIEF DESCRIPTION OF THE DRAWINGS

FIG. 7 is a diagram schematically illustrating a screen displayed on a display for inputting information on the type of a printing medium in the printing apparatus according to the first embodiment;

FIG. 12 is a diagram illustrating a relationship between the combination of the wettability and absorbency of each type of printing medium and the ON or OFF of an air blow, a pass mask A or B, and the amount of a reaction liquid to be applied according to the first embodiment;

FIGS. 23A and 23B are diagrams illustrating relationships between printing conditions for the existing and new types of printing media listed in FIG. 12, and a wettability flag and an absorbency flag registered as information on the printing medium characteristics;

FIG. 27 is a diagram illustrating a table according to a fourth embodiment;

FIG. 28A is illustrates the result of applying the table of FIG. 27 to a printing medium whose ink fixation characteristics have been identified, and FIG. 28B illustrates this result after further individual adjustments;

DESCRIPTION OF THE EMBODIMENTS

Embodiments of the present disclosure will be described in detail below with reference to the drawings.

First Embodiment

Figure 1:
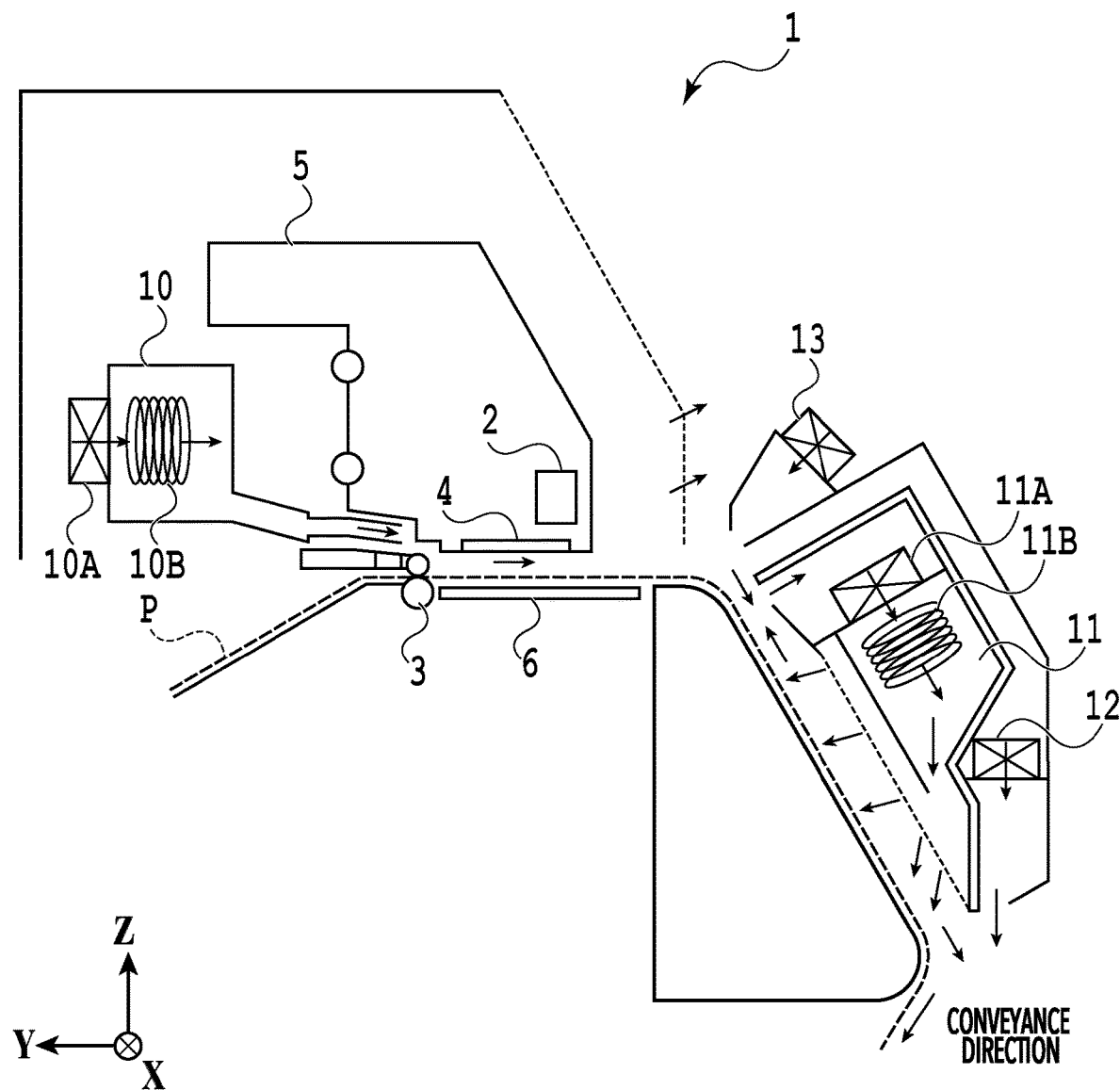
FIG. 1 is a side view schematically illustrating a schematic configuration of an inkjet printing apparatus according to a first embodiment.

FIG. 1 is a side view schematically illustrating a schematic configuration of an inkjet printing apparatus according to a first embodiment. An inkjet printing apparatus (hereinafter also referred to simply as "printing apparatus") 1 conveys a printing medium P with a conveyance mechanism including a conveyance roller pair 3 formed of a conveyance roller and a pinch roller. Moreover, a print head 4 is scanned over the conveyed printing medium P along the X direction illustrated in FIG. 1, and the print head 4 is caused to eject inks or the like during that scan to thereby print an image or the like on the printing medium P. In the example illustrated in FIG. 1, the printing medium P is in a so-called roll-to-roll form which is fed in a rolled state and rolled up again after printing. The printing medium P is not of course limited to this form, and may be in the form of a cut sheet, for example. As the printing medium P, it possible to use a printing medium registered in advance in the printing apparatus or a printing medium registered by printing medium type identification, as will be described with reference to FIGS. 7, 12, etc. Types of printing media include those that can be distinguished based on the difference in wettability and ink absorbency. The print head 4 is mounted on a carriage 5. The carriage 5 is configured to be movable along the X direction, making it possible to scan the print head 4 over the printing medium P. The print head 4 includes ejection ports for each type of ink which will be described later with reference to FIG. 3, and ejects the inks from the respective ejection ports according to print data to apply the inks to the printing medium P. An optical sensor 2 is attached to the carriage 5 and, as will be described with reference to FIGS. 2A and 2B, obtains the reflected optical densities of predetermined patterns of an ink applied to the printing medium P. A platen 6 is provided at a position opposed to the scan region for the print head 4 and supports the printing medium P from its back side. The platen 6 enables the printing medium P to be sucked with such a force as not to impede its conveyance by a suction mechanism including a suction port (not illustrated). The print head 4 can also be configured to be detachably mounted on the carriage 5.

The printing apparatus 1 includes a component for ink fixation. Specifically, a platen air blow unit 10 is provided upstream of the print head 4 in the conveyance direction of the printing medium P. This air blow unit 10 includes a fan 10A and a heater 10B and blows warm air at a predetermined temperature to the printing medium's portion to which the inks ejected from the print head 4 are applied. In this way, the inks applied to the printing medium can be dried, as will be described later with reference to FIG. 11, etc. A fixation unit 11, on the other hand, is provided downstream of the print head 4, and dries and fixes the applied inks on the printing medium P after printing. The fixation unit 11 includes a substantially box-shaped housing. The housing's bottom portion, which is open, faces a surface of the printing medium P. The fixation unit 11 includes a fan 11A and a heater 11B inside the housing. In this way, it is possible to blow warm air toward the printing medium P to vaporize the water and solvent contained in the inks and thereby fix the applied inks and the like to the printing medium. A downflow unit 12 includes a fan (not illustrated) and blows the warm air discharged from the fixation unit 11 toward a lower side of the apparatus. An air curtain unit 13 is provided between the platen 6 and the fixation unit 11, and prevents a mist of the inks and the like drifted by the air blown by the platen air blow unit 10 from getting into the fixation unit 11.

Figure 2A:
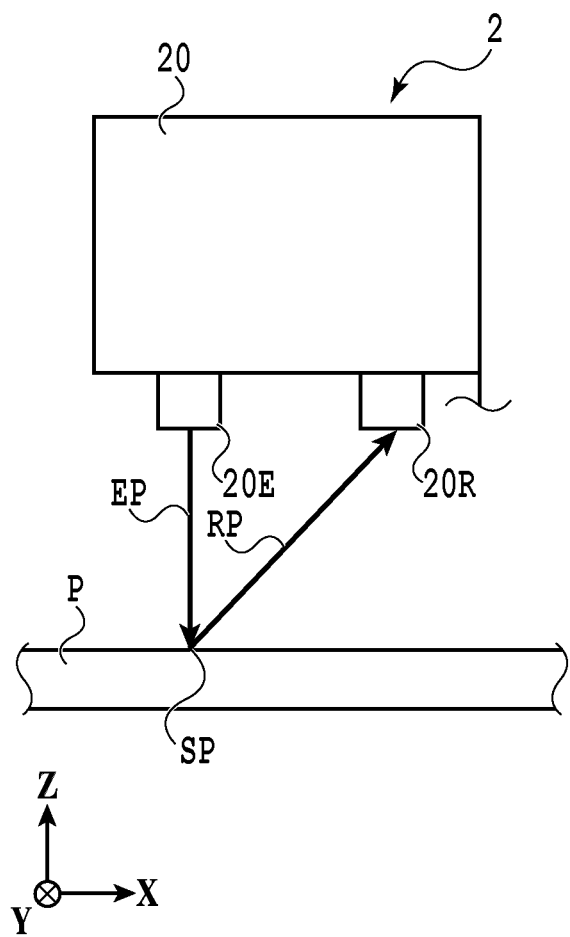
FIGS. 2A and 2B are views illustrating a schematic configuration of an optical sensor illustrated in FIG. 1.
Figure 2B:
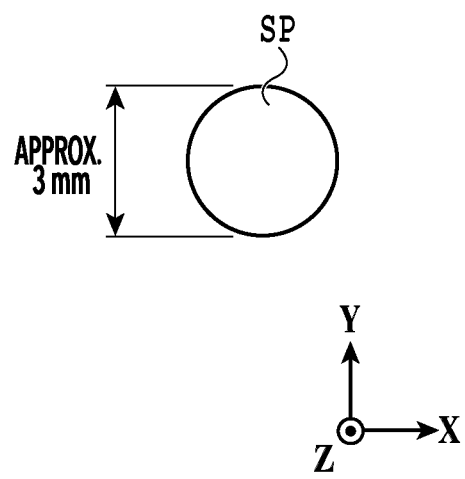

FIGS. 2A and 2B are views illustrating a schematic configuration of the optical sensor illustrated in FIG. 1. FIG. 2A illustrates a light beam applied from the sensor and its reflection from a printing medium. FIG. 2B illustrates a detection spot with the applied light beam. The optical sensor 2 includes, on its main body 20, a light emitting unit 20E including light emitting diodes (LEDs) of colors such as red (R), green (G), and blue (B), and a light receiving unit 20R including a photodiode. The main body 20 is fixedly provided on the carriage 5 such that a detection spot SP is located downstream of ejection port arrays in the print head 4 on the +Y side in the movement direction of the carriage 5 (a direction along the Y direction illustrated in FIG. 2A). The light emitting unit 20E and the light receiving unit 20R are provided on the bottom side of the main body 20. The light emitting unit 20E applies a light beam to the printing medium P. The light receiving unit 20R receives light reflected by the printing medium P. In this case, a light beam EP applied by the light emitting unit 20E undergoes diffuse reflection by the printing medium P, and the light receiving unit 20R receives that reflected light beam RP. The diameter of the detection spot at which the light beam EP applied by the light emitting unit 20E is reflected by the printing medium P is approximately 3 mm, for example.

A detection signal (analog signal) of the reflected light beam RP received by the light receiving unit 20R is transferred to a control circuit (not illustrated) of the printing apparatus 1 through a flexible cable (not illustrated) and the like and converted into a digital signal by analog-to-digital (A/D) converter in the control circuit. Detection of optical characteristics of test patterns to be described later involves alternately conveying the printing medium P in the Y direction and moving the carriage 5 to which the optical sensor 2 is attached in the X direction. As a result, the optical sensor 2 detects the densities of the patterns printed on the printing medium P as optical reflectances in synchronization with timing based on a position signal obtained by an encoder (not illustrated). In the present embodiment, as will be described later, the light beam EP is applied to the test patterns on the printing medium P to detect reflection intensities representing the densities of the patterns. On the printing medium P, which is white, the reflection intensity is strong. The higher the density of a pattern, the weaker the reflection intensity.

Figure 3:
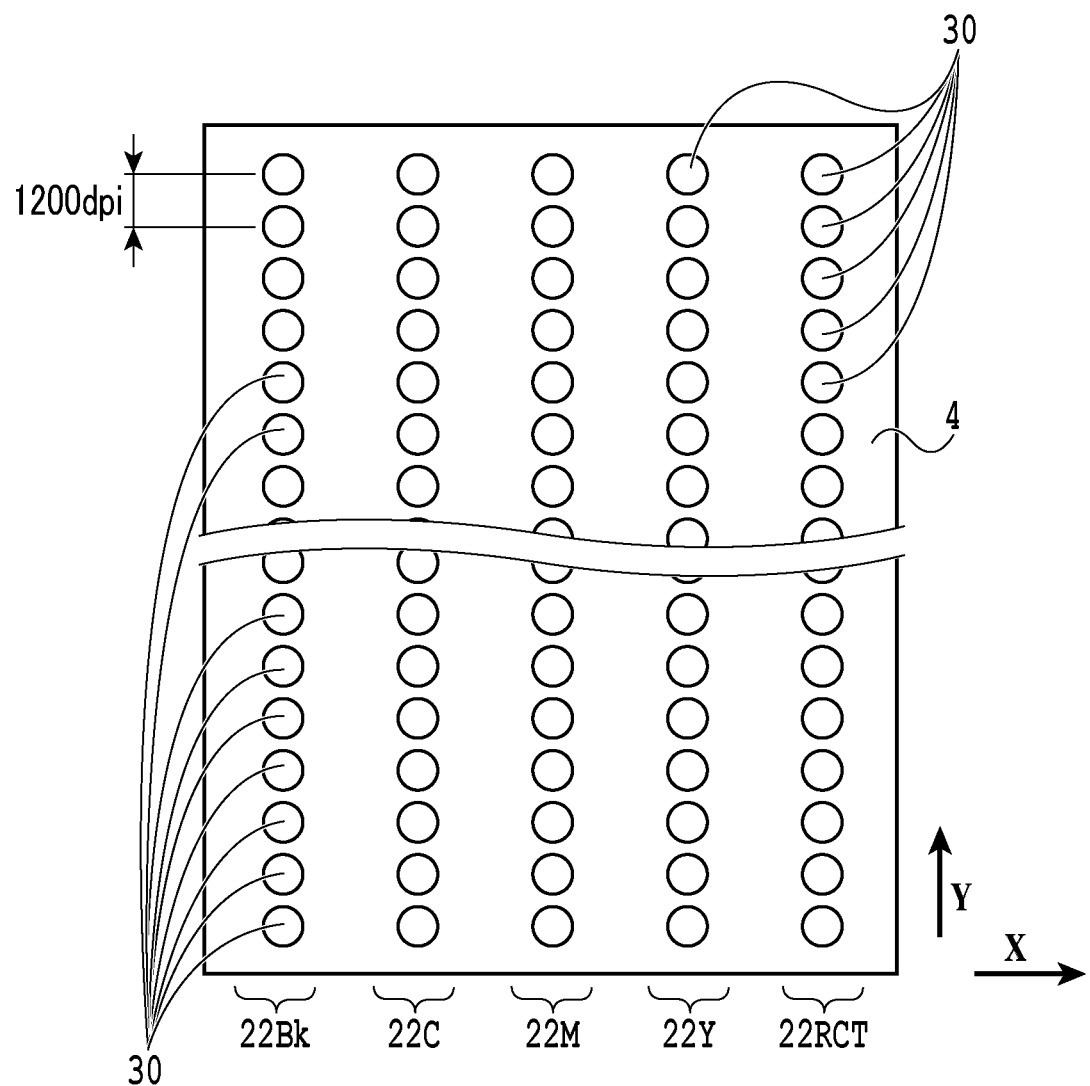
FIG. 3 is a view schematically illustrating an ejection port surface of a print head according to the first embodiment.

FIG. 3 is a view schematically illustrating the ejection port surface of the print head 4 according to the present embodiment. The print head 4 includes ejection port arrays each of which ejects an ink containing a colorant (hereinafter referred to also as "color ink", "colorant ink", or "first liquid"). Specifically, the print head 4 includes an ejection port array 22Bk that ejects a black ink (Bk), an ejection port array 22C that ejects a cyan ink (C), an ejection port array 22M that ejects a magenta ink (M), and an ejection port array 22Y that ejects a yellow ink (Y). The print head 4 further includes an ejection port array 22RCT that ejects a reaction liquid (RCT) containing no colorant (hereinafter referred to also as "second liquid"). This reaction liquid contains a component that reacts with the colorants contained in the color inks. By contacting the color inks on a printing medium, the reaction liquid causes their colorants to aggregate. This prevents bleeding of the color inks and also improves their densities. It is to be noted that the term "ink" may include the reaction liquid herein.

In the print head 4, the ejection port arrays 22Bk, 22C, 22M, 22Y, and 22RCT are arranged in this order from the left toward the right in the X direction in FIG. 3. In each of these ejection port arrays 22Bk, 22C, 22M, 22Y, and 22RCT, 1280 ejection ports 30 that eject the corresponding ink are arrayed in the Y direction (array direction) at a density of 1200 dpi. The amount of the ink to be ejected from a single ejection port 30 in a single ejection action in the present embodiment is approximately 4.5 pl. Ink channels corresponding to the ejection port arrays 22Bk, 22C, 22M, 22Y, and 22RCT are connected to ink tanks (not illustrated) storing the corresponding inks to supply the inks. The print head 4 and the ink tanks used in the present embodiment may be configured integrally with each other or configured to be separable from each other.

Figure 4:
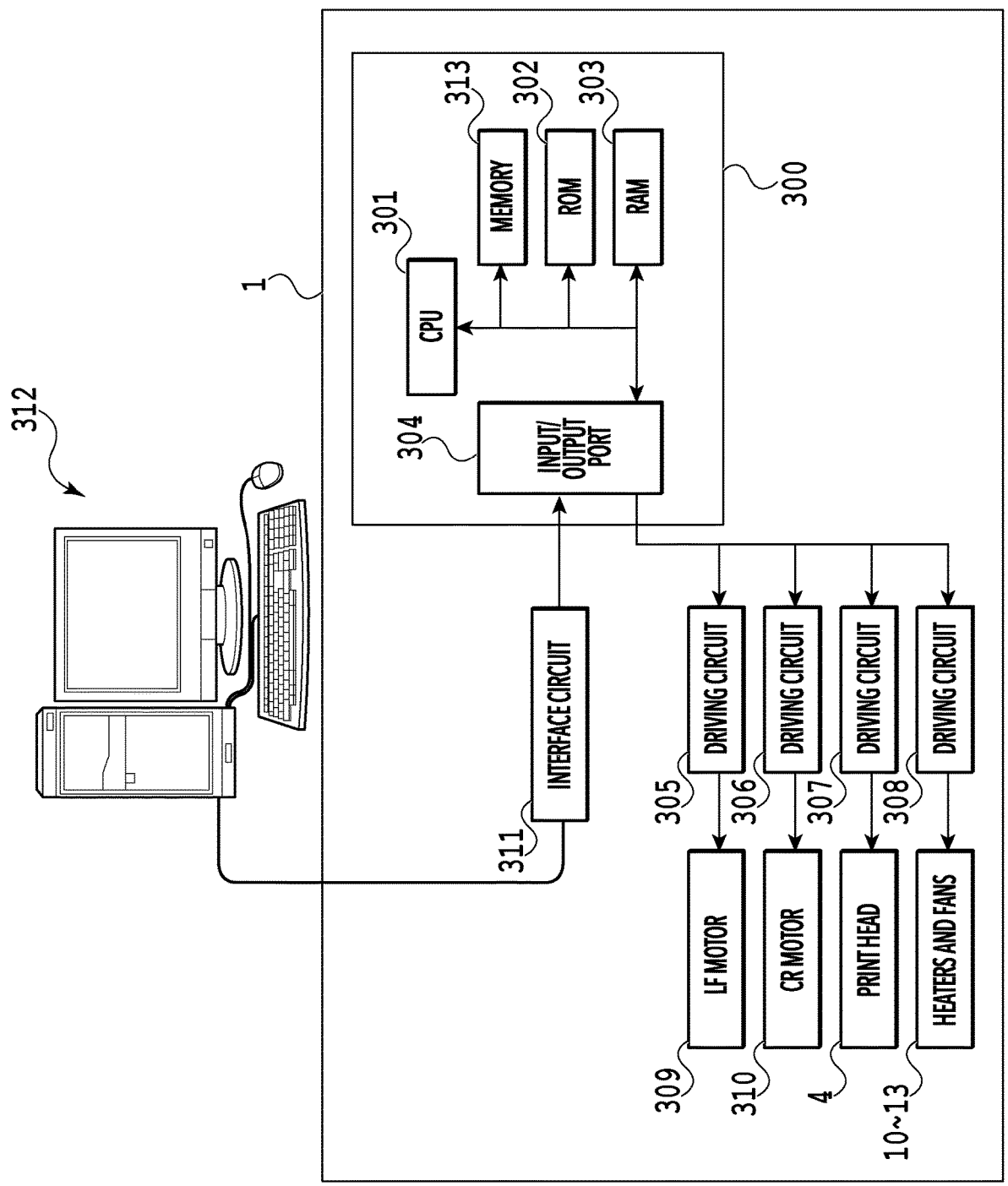
FIG. 4 is a block diagram illustrating a control configuration of the printing apparatus according to the first embodiment.

FIG. 4 is a block diagram illustrating a control configuration of the printing apparatus 1 according to the present embodiment. A control unit 300 includes a central processing unit (CPU) 301 that executes processing operations such as calculation, discrimination, and control as well as printing operations. The control unit 300 includes a read-only memory (ROM) 302 storing a control program to be executed by the CPU 301 and the like, a random-access memory (RAM) 303 to be used as a buffer for print data and the like, a memory 313, an input/output port 304, and so on. Various driving circuits 305, 306, 307, and 308 are connected to the input/output port 304. The driving circuit 305 drives a conveyance motor (LF motor) 309 serving as a driving source for conveying printing media. The driving circuit 306 drives a carriage motor (CR motor) 310. The driving circuit 307 drives the print head 4 for ink ejection. The driving circuit 308 individually drives the platen air blow unit 10 and the other air blow units illustrated in FIGS. 1 (11 to 13). The control unit 300 is connected to a host apparatus (personal computer (PC)) 312 via an interface circuit 311.

<Multipass Printing>

Figure 5:
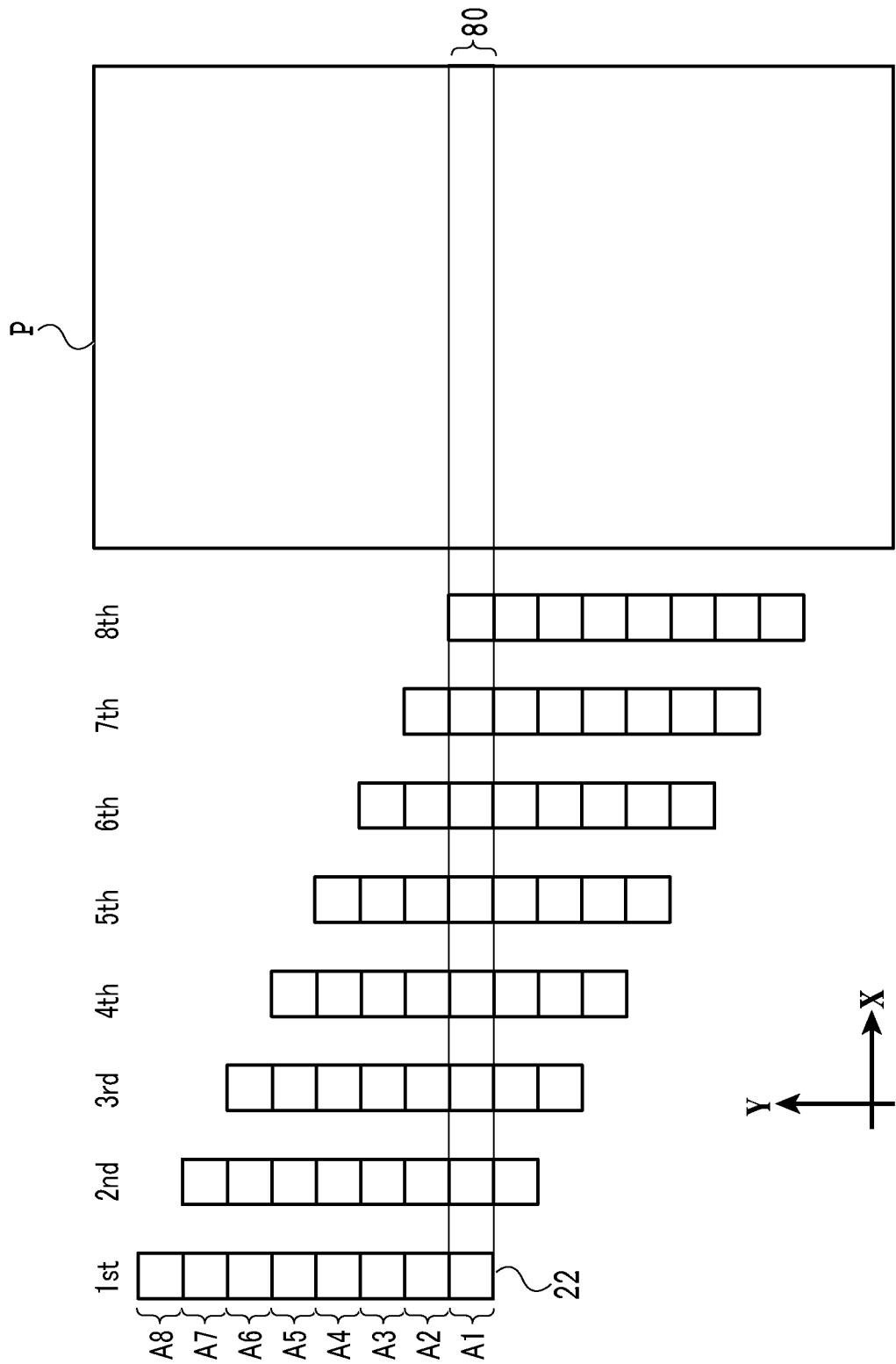
FIG. 5 is a diagram for explaining multipass printing according to the first embodiment.
Figure 6:
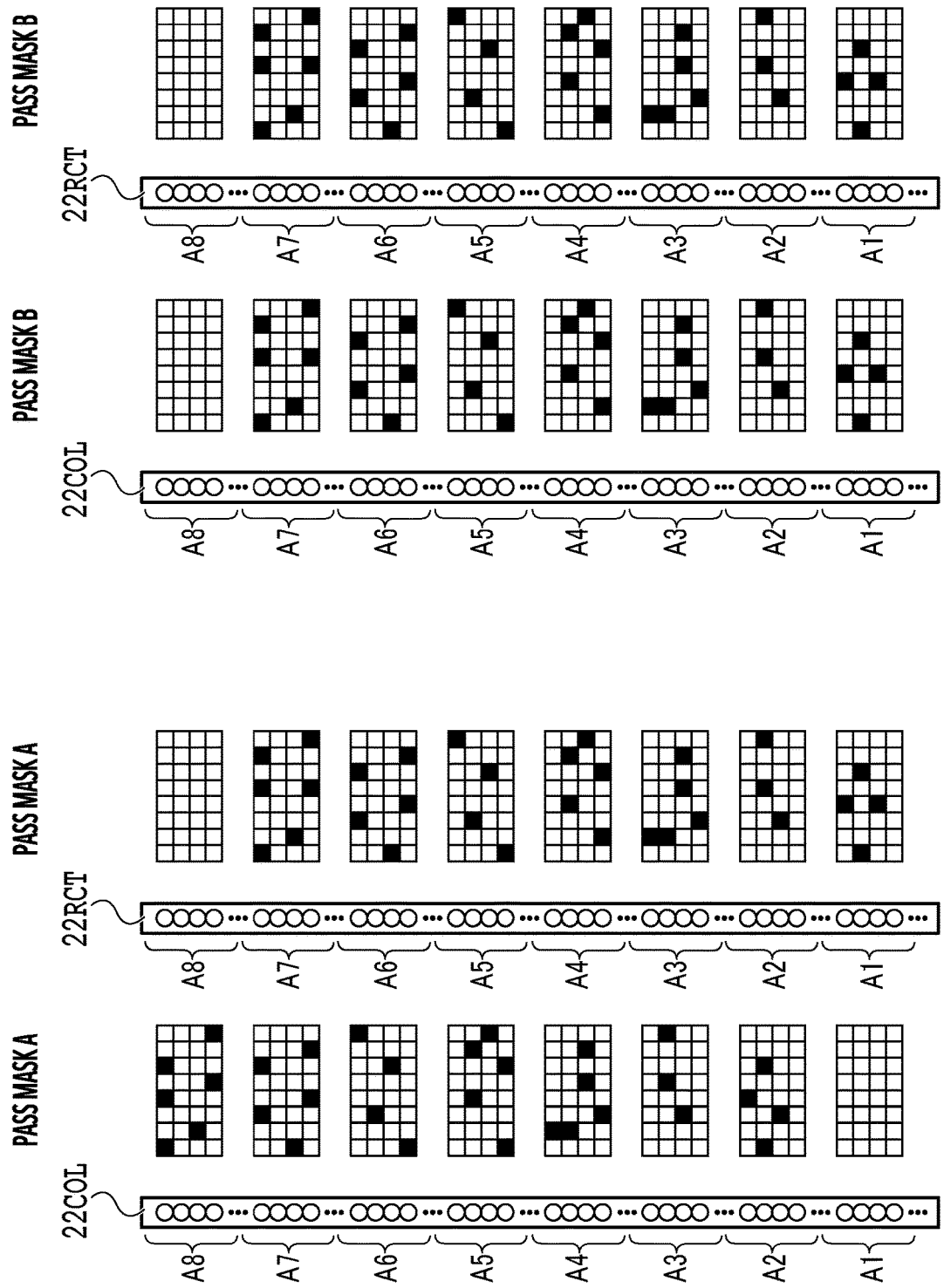
FIGS. 6A to 6D are diagrams illustrating relationships between mask patterns and ejection port groups used in 8-pass multipass printing according to the first embodiment.

The printing apparatus according to the present embodiment is capable of performing so-called multipass printing in which printing of a unit region on a printing medium is completed by performing multiple scanning operations over the unit region and an operation of conveying the printing medium by an amount corresponding to the unit region between these scans. FIG. 5 is a diagram for explaining the multipass printing according to the present embodiment. In the example illustrated in FIG. 5, each ejection port array (representatively described as "ejection port array 22" below) is divided in the Y direction into eight ejection port groups A1 to A8, which are assigned to a unit region 80 to complete printing in eight scans (hereinafter referred to as "8-pass printing"). Note that the printing medium P is actually conveyed downstream in the conveyance direction (the Y direction in FIG. 5) between scans but the ejection port array 22 (print head 4) is depicted as being moved in the opposite direction to the Y direction between scans for simple illustration.

In a first scan 1st, the print head 4 is scanned with the ejection port group A1 in the ejection port array 22 facing the unit region 80 on the printing medium P, and the ejection port group A1 is caused to eject the ink according to print data corresponding to the first scan. After this first scan, the printing medium P is conveyed in the Y direction over a distance corresponding to a single ejection port group (an amount corresponding to the unit region 80 in the conveyance direction), so that the ejection port group A2 in the ejection port array 22 faces the unit region 80. A second scan 2nd is performed, and the ejection port group A2 is caused to eject the ink onto the unit region 80 according to print data corresponding to the second scan. Thereafter, conveyance of the printing medium P and ejection from the print head are performed alternately in a similar manner to cause the ejection port groups A3 to A8 to eject the inks onto the unit region 80 in third to eighth scans 3rd to 8th. As a result, printing on the unit region 80 is completed.

FIGS. 6A to 6D are diagrams illustrating relationships between mask patterns and ejection port groups used in the 8-pass multipass printing according to the present embodiment. The mask patterns are used in a masking process that is used in the distribution process to be described later with reference to FIG. 10, and are each a pattern with mask elements that permit printing of quantized data and mask elements that do not permit printing of the quantized data, each of which corresponds to a pixel forming an image. The mask elements depicted in black in the mask patterns illustrated in FIGS. 6A to 6D represent mask elements that permit ink ejection (printing) in a case there the corresponding pieces of data in the quantized data indicate ink ejection. The mask elements depicted in white represent elements that do not permit ink ejection even in a case where the corresponding pieces of data in the quantized data indicate ink ejection. FIGS. 6A to 6D illustrate mask patterns each having a size of 4 elements (pixels)×8 elements (pixels). The distribution process is performed on all pieces of quantized data each corresponding to a unit region by repetitively applying these mask patterns in the X direction and the Y direction. Specifically, each mask pattern is repetitively applied 40 times in the Y direction for a single ejection port group Ak (k=1 to 8) (160 ejection port per ejection port group÷4 mask element).

FIG. 6A illustrates mask patterns to be applied to quantized data for an ejection port array 22COL for a color ink (C, M, Y, Bk). FIG. 6B illustrates mask patterns to be applied to quantized data for the ejection port array 22RCT for the reaction liquid. As illustrated in FIG. 6A, printing permitting elements are arranged in the mask patterns to be applied to the ejection port groups A2 to A8 for the second to eighth scans among the ejection port groups A1 to A8 for the first to eighth scans. No printing permitting pixel is arranged in the mask pattern to be applied to the ejection port group A1 for the first scan. In this way, the color ink will be ejected only in the second to eighth scans out of the eight scans. On the other hand, as illustrated in FIG. 6B, as for the ejection port array 22RCT for the reaction liquid, printing permitting elements are arranged in the mask patterns to be applied to the ejection port groups A1 to A7 for the first to seventh scans among the ejection port groups A1 to A8 for the first to eighth scans. No printing permitting pixel is arranged in the mask pattern to be applied to the ejection port group A8 for the eighth scan. In this way, the reaction liquid will be ejected only in the first to seventh scans out of the eight scans.

The above-described mask patterns in FIGS. 6A and 6B will be referred to as "pass mask A". Applying this pass mask A enables the reaction liquid to be ejected in a scan immediately before a scan in which a color ink will be ejected. In this way, as soon as the color ink is ejected and lands on the printing medium, the colorant in the color ink contacts the reaction liquid already present on the printing medium, so that the colorant starts aggregation. This reduces the bleeding of the color ink in a preferable manner. On the other hand, the mask patterns illustrated in FIGS. 6C and 6D are a pass mask B which allows the color ink and the reaction liquid to be ejected and contact each other in the same scan. This enables the color ink to contact the reaction liquid before being absorbed into the printing medium. The above pass masks A and B can be used interchangeably according to the fixation characteristics of the inks and the like on the printing medium, as will be described later in detail.

<Inks and Reaction Liquid>

The composition of each ink will be described below.

The color inks (C, M, Y, and Bk) and the reaction liquid (RCT) used in the present embodiment each contain a water-soluble organic solvent. The water-soluble organic solvent is preferably one with a boiling point of 150° C. or more and 300° or less in view of the wettability and moisture retentiveness of the face of the print head 4. Ketone-based compounds such as acetone and cyclohexanone, propylene glycol derivatives such as tetraethylene glycol dimethyl ether, and heterocyclic compounds having a lactam structure as represented by N-methyl-pyrrolidone and 2-pyrrolidone are particularly preferable. From the viewpoint of ejection performance, the content of the water-soluble organic solvent is preferably 3 wt % or more and 30 wt % or less. Specific examples of the water-soluble organic solvent include: alkyl alcohols having one to four carbon atoms such as methyl alcohol, ethyl alcohol, n-propyl alcohol, isopropyl alcohol, n-butyl alcohol, sec-butyl alcohol, and tert-butyl alcohol; amides such as dimethylformamide and dimethylacetamide; ketones or keto-alcohols such as acetone and diacetone alcohol; ethers such as tetrahydrofuran and dioxane; polyalkylene glycols such as polyethylene glycol and polypropylene glycol; ethylene glycol; alkylene glycols with an alkylene group having two to six carbon atoms such as propylene glycol, butylene glycol, triethylene glycol, 1,2,6-hexane triol, thiodiglycol, hexylene glycol, and diethylene glycol; lower alkyl ether acetates such as polyethylene glycol and monomethyl ether acetate; glycerin; lower alkyl ethers of polyhydric alcohols such as ethylene glycol monomethyl (or ethyl) ether, diethylene glycol methyl (or ethyl) ether, and triethylene glycol monomethyl (or ethyl) ether; polyalcohols such as trimethylolpropane and trimethylolethane; N-methyl-2-pyrrolidone; 2-pyrrolidone; 1,3-dimethyl-2-imidazolidinone; and the like. Water-soluble organic solvents as listed above can be used alone or as a mixture. Deionized water is desirably used as the water. The content of the water-soluble organic solvent in the reaction liquid (RCT) is not particularly limited. Besides the above components, a surfactant, a defoamer, a preservative, a mildewproofing agent, and the like may be added as appropriate to each color ink (C, M, Y, Bk) in order to impart desired physical properties.

The color inks (C, M, Y, and Bk) and the reaction liquid (RCT) used in the present embodiment each contain a surfactant. The surfactant is used as a penetrant to improve the permeability of ink into a printing medium dedicated for inkjet printing. The larger the amount of the surfactant added, the stronger a property of lowering the surface tension of the ink, and the more the wettability and permeability of the ink on and into a printing medium are improved. In the present embodiment, an acetylene glycol EO adduct is added in a small amount as a surfactant to adjust the surface tension of each ink to 30 dYn/CM or less and adjust the difference in surface tension between the inks to 2 dYn/CM or less. More specifically, the surface tensions of all inks are set at approximately 28 to 30 dYn/CM. The surface tension is measured using a fully-automatic surface tensiometer CBVP-Z (manufactured by Kyowa Interface Science Co., Ltd.). The measurement apparatus is not limited to the one exemplarily mentioned above as long as the surface tension of each ink can be measured.

Meanwhile, the pH of each ink in the present embodiment is stable on the alkali side, and the value is 8.5 to 9.5. The pH of each ink is preferably 7.0 or more and 10.0 or less from the viewpoint of preventing elution and deterioration of members inside the printing apparatus and the print head that contact the ink, lowering of the solubility of a dispersion resin in the ink, and so on. The pH is measured using a pH meter F-52 manufactured by HORIBA, Ltd. The measurement apparatus is not limited to the one exemplarily mentioned above as long as the pH of each ink can be measured.

Color Inks

Of the black ink (Bk), the cyan ink (C), the magenta ink (M), and the yellow ink (Y) used in the present embodiment, the cyan ink (C) and the magenta ink (M) will be described in detail below for simplicity.

<Magenta Ink>

Preparation of Dispersion Liquid

First, using benzyl acrylate and methacrylic acid as raw materials, an AB block polymer having an acid value of 300 and a number average molecular weight of 2500 is produced in a usual manner, and further is neutralized with a potassium hydroxide aqueous solution and diluted with ion-exchanged water to prepare a homogeneous 50-mass % polymer aqueous solution.

100 g of the above polymer solution, 100 g of C. I. Pigment Red 122, and 300 g of ion-exchanged water are mixed and mechanically agitated for 0.5 hour.

Then, using a micro-fluidizer, this mixture is processed by passing it through an interaction chamber five times under a liquid pressure of approximately 70 MPa.

Further, the dispersion liquid obtained in the above is subjected to a centrifugation process (12,000 RPM, 20 minutes) to remove non-dispersive substances including coarse particles, so that a magenta dispersion liquid is obtained. The magenta dispersion liquid obtained has a pigment concentration of 10 mass %, and a dispersant concentration of 5 mass %.

Preparation of Ink

In the ink preparation, the above magenta dispersion liquid is used. The following components are added to this at a predetermined concentration. Further, these components are sufficiently mixed and agitated and then filtered under pressure through a micro-filter with a pore size of 2.5 µm (manufactured by FUJIFILM Corporation) to prepare a color ink having a pigment concentration of 4 mass % and a dispersant concentration of 2 mass %.

| | |
|---|---|
| The above magenta dispersion liquid | 40 parts |
| 2-pyrrolidone | 5 parts |
| 2-methyl 1,3 propanediol | 15 parts |
| Acetylene glycol EO adduct | 0.5 part |
| Ion-exchanged water (manufactured by Kawaken Fine Chemicals Co., Ltd.) | balance |

Cyan Ink
Preparation of Dispersion Liquid

First, using benzyl acrylate and methacrylic acid as raw materials, an AB block polymer having an acid value of 250 and a number average molecular weight of 3000 is produced in a usual manner, and further is neutralized with a potassium hydroxide aqueous solution and diluted with ion-exchanged water to prepare a homogeneous 50-mass % polymer aqueous solution.

180 g of the above polymer solution, 100 g of C.I. Pigment Blue 15:3, and 220 g of ion-exchanged water are mixed and mechanically agitated for 0.5 hour.

Then, using a micro-fluidizer, this mixture is processed by passing it through an interaction chamber five times under a liquid pressure of approximately 70 Mpa.

Further, the dispersion liquid obtained in the above is subjected to a centrifugation process (12,000 RPM, 20 minutes) to remove non-dispersive substances including coarse particles, so that a cyan dispersion liquid is obtained. The cyan dispersion liquid obtained has a pigment concentration of 10 mass %, and a dispersant concentration of 10 mass %.

Preparation of Ink

In the ink preparation, the above cyan dispersion liquid is used. The following components are added to this at a predetermined concentration. Further, these components are sufficiently mixed and agitated and then filtered under pressure through a micro-filter with a pore size of 2.5 µm (manufactured by FUJIFILM Corporation) to prepare a color ink having a pigment concentration of 4 mass % and a dispersant concentration of 2 mass %.

| | |
|---|---|
| The above cyan dispersion liquid | 20 parts |
| 2-pyrrolidone | 5 parts |
| 2-methyl 1,3 propanediol | 15 parts |
| Acetylene glycol EO adduct | 0.5 part |
| Ion-exchanged water (manufactured by Kawaken Fine Chemicals Co., Ltd.) | balance |

Reaction Liquid

The reaction liquid used in the present embodiment contains a reactive component that reacts with the pigments contained in the inks to cause the pigments to aggregate or gel. More specifically, in a case where the reaction liquid is mixed on a printing medium with an ink containing a pigment stably dispersed or dissolved in a water-soluble medium by the function of an ionic group, this reactive component destroys the stability of the dispersion of the pigment. In the present embodiment, glutaric acid is used as the reactive component.

It is not essential to use glutaric acid. In the present embodiment, any of various organic acids is usable as the reactive component of the reaction liquid as long as it is water soluble. Examples of the organic acids include oxalic acid, polyacrylic acid, formic acid, acetic acid, propionic acid, glycolic acid, malonic acid, malic acid, maleic acid, ascorbic acid, levulinic acid, succinic acid, glutaric acid, glutamic acid, fumaric acid, citric acid, tartaric acid, and lactic acid. Further specific examples include pyrrolidonecarboxylic acid, pyronecarboxylic acid, pyrrolecarboxylic acid, furancarboxylic acid, pyridinecarboxylic acid, coumalic acid, thiophenecarboxylic acid, nicotinic acid, oxysuccinic acid, and dioxysuccinic acid. The content of the organic acid is preferably 3.0% by mass or more and 90.0% by mass or less and more preferably 5.0% by mass or more and 70.0% by mass or less relative to the total mass of the compositions contained in the reaction liquid.

Preparation of Ink

In the present embodiment, glutaric acid (manufactured by Wako Pure Chemical Industries, Ltd.) is used as the organic acid, and the following components are mixed to prepare a reaction liquid.

| | |
|---|---|
| Glutaric acid | 3 parts |
| 2-pyrrolidone | 5 parts |
| 2-methyl 1,3 propanediol | 15 parts |
| Acetylene glycol EO adduct | 0.5 part |
| Ion-exchanged water (manufactured by Kawaken Fine Chemicals Co., Ltd.) | balance |

<Printing Medium>

The printing apparatus in the present embodiment can use multiple types of printing media from the viewpoint of fixation characteristics. +The printing media usable by the printing apparatus in the present embodiment include non-absorbent printing media which do not let the moisture contained in the inks to permeate therethrough, poorly absorbent printing media which have poor absorbency of the moisture contained in the inks, and printing media for inkjet printing which have relatively high moisture absorbency. The usable printing media are also categorized into easily wettable printing media and poorly wettable printing media since the surface tensions of the inks applied to a printing medium vary by the surface energy of the surface layer of the printing medium. Thus, in the present embodiment, printing media are categorized into three types based on absorbency and two types based on wettability. Moreover, the printing media used in the present embodiment include ones which have been registered in advance and ones whose fixation characteristics described above are identified by a printing medium identification process to be described later and which are newly registered.

FIG. 7 is a diagram schematically illustrating a screen (user interface (UI)) displayed on a display of the PC 312 in a case where the user inputs information on the type of a printing medium. In the example illustrated in FIG. 7, eight existing types of printing media and types of printing media identified by the identification process and newly registered are listed. The eight existing types of printing media are "vinyl chloride film", "vinyl chloride banner", "polypropylene (PP) film", "YUPO", "wallpaper", "plain paper", "glossy paper", "art paper", and "coated paper". The newly registered printing media are ones registered via the identification process to be described later with reference to FIG. 13 and subsequent drawings in a case where the user attempts to use an unregistered printing medium. "A: easily-wettable/non-absorbent printing medium" is listed in FIG. 7 as an example of the printing media registered via the identification process.

Of the registered existing recording media in FIG. 7, "vinyl chloride film", "vinyl chloride banner", "PP film", and "YUPO" are non-absorbent printing media. These are a printing medium including a base member with a plastic layer formed on its outermost surface, a printing medium including a base member without an ink reception layer formed thereon, a sheet, film, or banner made of glass, YUPO, plastic, or the like, and so on. Examples of the formed plastic include polyvinyl chloride, polyethylene terephthalate, polycarbonate, polystyrene, polyurethane, polyethylene, polypropylene, and the like. These non-absorbent printing media have excellent water resistance, light fastness, and rub fastness, and are therefore usually used in a case of printing a printed object to be displayed outdoors. Also, "glossy paper", "art paper", and "coated paper" are printing media for inkjet printing with high absorbency which the moisture contained in the inks can permeate. These printing media have lower water resistance, light fastness, and rub fastness than those of poorly absorbent printing media, but are capable of absorbing the applied inks into their ink reception layers and therefore have excellent color development properties, which allows high-quality printing. For this reason, these printing media are usually used in a case of printing a printed object to be displayed indoors. The absorbency is so high that the color inks permeate the printing media before contact one another. This eliminates the need for a reaction liquid. Moreover, "plain paper" and "wallpaper" are poorly absorbent printing media whose surface layer is made of a pulp material or a coating layer and therefore absorbs moisture at a low rate. In the poorly absorbent printing media, the color inks contact one another before being absorbed into the printing media, so that bleeding of the color inks occurs. For this reason, a reaction liquid is used to prevent the bleeding of the color inks in the poorly absorbent printing media.

In order to separate poorly absorbent printing media and non-absorbent printing media, a liquid transfer amount Vt per unit time is used as an index to quantify the "absorbency" of each printing medium. As a method of measuring the liquid transfer amount Vt, there is "Bristow's method", in which the amount of water sucked in a short period of time immediately after contact with the water. In Bristow's method, a predetermined amount V of a liquid is put in a container having a small opening, and the opening is brought into contact with a paper surface and an area wL of the region to which the liquid has transferred. In this way, the liquid transfer amount Vt per unit time can be calculated using the equation Vt=V/wL.

Figure 8A:
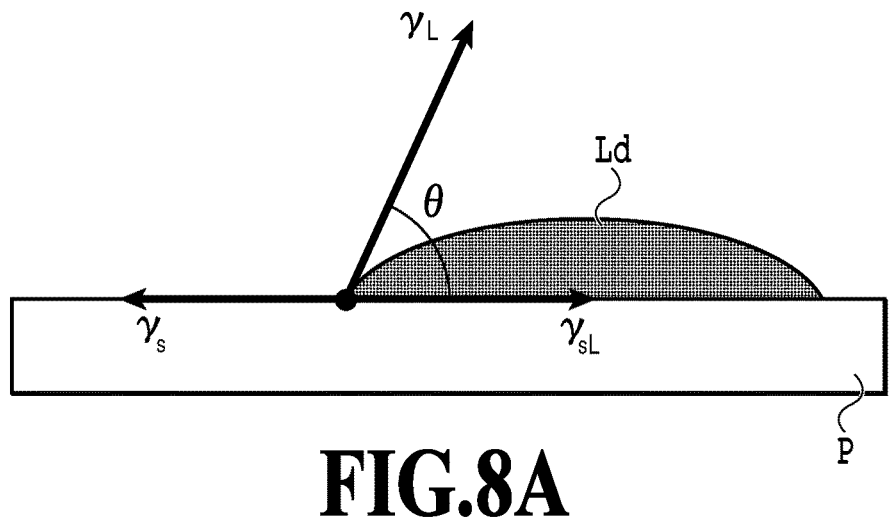
FIGS. 8A to 8C are diagrams explaining quantization of "wettability" of printing media according to the first embodiment.
Figure 8B:
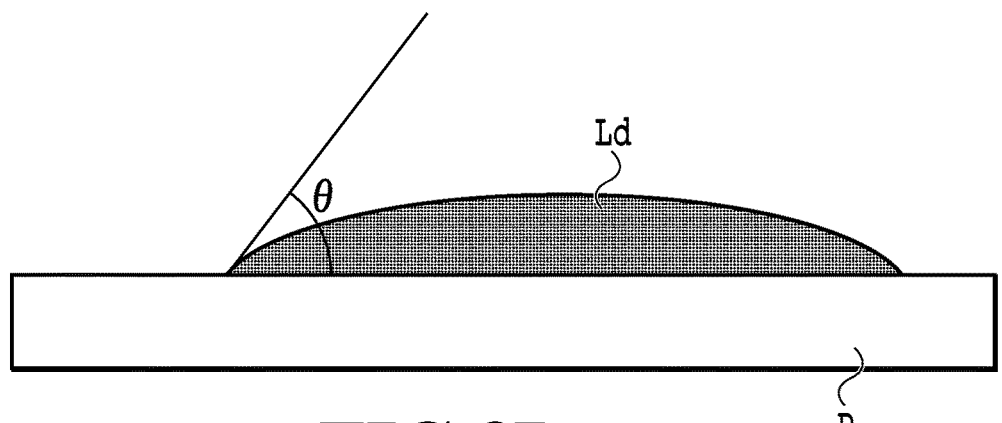
Figure 8C:
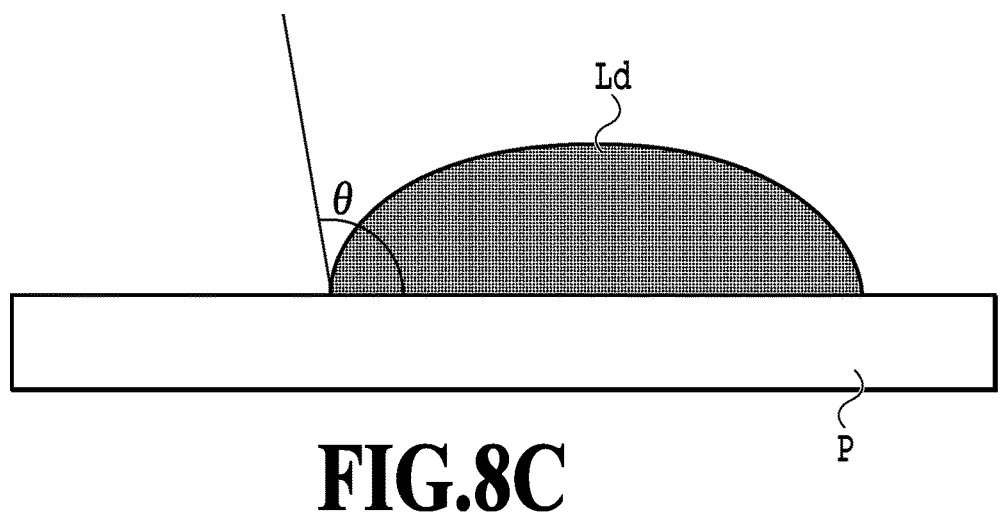

Wettability can also be quantized. FIGS. 8A to 8C are diagrams explaining the quantization of "wettability" of printing media. As an index to quantize "wettability", "contact angle" ($\theta$) has been known. As illustrated in FIG. 8A, "contact angle" refers to an angle $\theta$ formed between a surface of the printing medium P and a line tangent to a droplet Ld at a point at which the droplet Ld crosses the surface, and the contact angle $\theta$ satisfies Young's equation $\gamma_s = \gamma_L \cdot \cos\theta + \gamma_{sL}$. FIG. 8B illustrates an easily wettable printing medium. An easily wettable printing medium is defined as one with a relatively narrow contact angle $\theta$, and a liquid such as an ink spreads when applied to the printing medium. FIG. 8C, on the other hand, illustrates a poorly wettable printing medium. A poorly wettable printing medium is defined as one with a wide contact angle $\theta$, and a liquid such as an ink do not spread when applied to the printing medium.

As described above, wettability and absorbency can each be quantized. However, in a case where, for example, the user of the printing apparatus attempts to use a printing medium other than those already registered, it is not realistic to perform the above processes for the quantization again. Thus, in the present embodiment, predetermined patterns are printed with the printing apparatus to be used, and their optical densities are measured with a sensor to identify the wettability and absorbency of the printing medium, as will be described later with reference to FIGS. 13 to 21.

Figure 9:
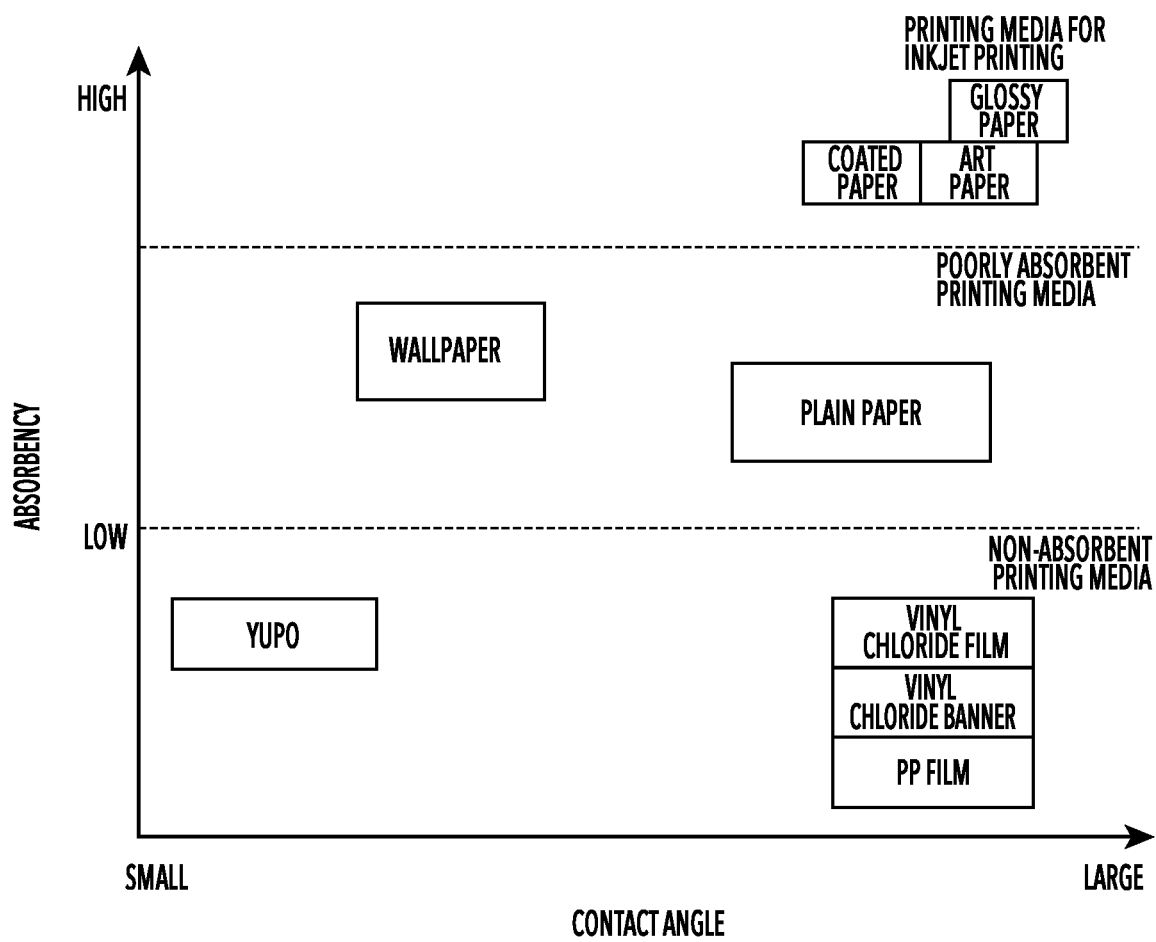
FIG. 9 is a diagram explaining categorization of printing media based on "absorbency" and "wettability" of the printing media.

FIG. 9 is a diagram explaining the categorization of printing media based on "absorbency" and "wettability" of the printing media. Here, "glossy paper", "art paper", "coated paper", which are printing media for inkjet printing, are categorized as printing media with relatively high "absorbency". Moreover, "plain paper" and "wallpaper", which are printing media with relatively low "absorbency", are categorized as poorly absorbent printing media. Furthermore, "vinyl chloride film", "vinyl chloride banner", "PP film", and "YUPO" are categorized as non-absorbent printing media. On the other hand, in terms of "wettability", of the non-absorbent printing media, "vinyl chloride film", "vinyl chloride banner", and "PP film", for example, are categorized as poorly wettable printing media with relatively wide contact angles, whereas "YUPO" is categorized as an easily wettable printing medium with a relatively narrow contact angle.

<Image Processing and Printing Control>

Figure 10:
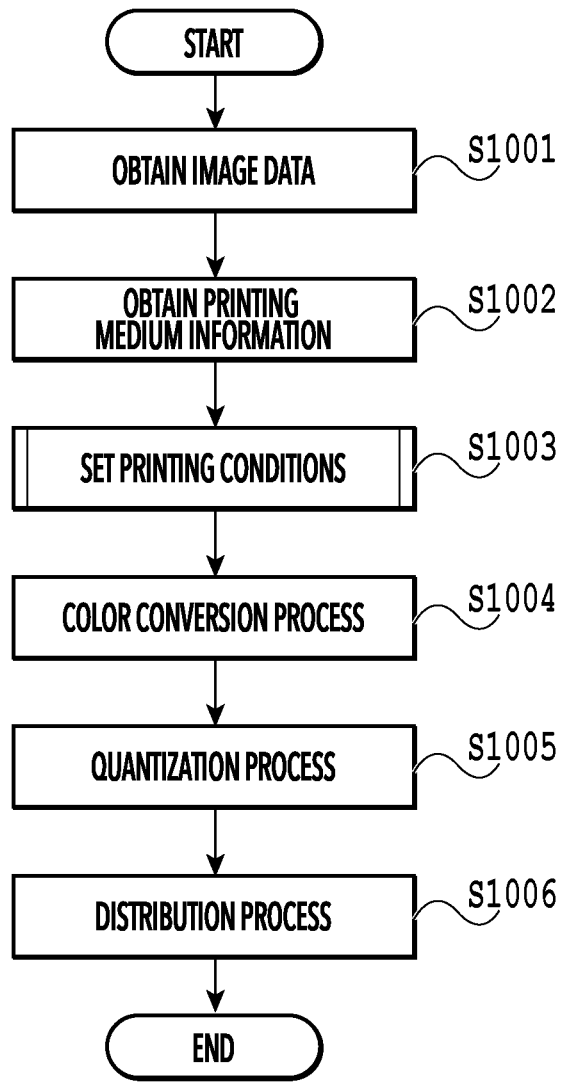
FIG. 10 is a flowchart illustrating a print data generation process (image processing) performed by the printing apparatus in the first embodiment.

FIG. 10 is a flowchart illustrating a print data generation process (image processing) executed by the printing apparatus in the present embodiment, and represents a process executed by the CPU 301 (see FIG. 4) in accordance with the control program stored in the ROM 302 (FIG. 4). This process is initiated in response to the user issuing a print instruction on the PC 312 (FIG. 4).

First, in step S1001, the printing apparatus 1 obtains image data in an RGB format input from the PC 312. Then, in step S1002, information on the type of the printing medium to be used in the printing is obtained. In the present embodiment, the user selects the printing medium to be used in the printing via the UI illustrated in FIG. 7, and obtains information on the type of the selected printing medium based on the input from the user. In this step, in a case where there is a printing medium whose wettability and absorbency are newly identified (e.g., "A: Easily-Wettable/Non-Absorbent Printing Medium" in FIG. 7), which will be described later with reference to FIG. 13 and subsequent drawings, that printing medium may be registered so that the user can select it.

Then, in step S1003, printing conditions are set based on the information on the printing medium obtained in step S1002. As will be described in detail later with reference to FIG. 11, in a case where "PP film", "vinyl chloride film", or "vinyl chloride banner", which is poorly wettable, is selected, for example, printing conditions for poorly wettable printing media are set in step S1003. On the other hand, in a case where "YUPO", which is easily wettable, is selected, printing conditions for easily wettable printing media are set in step S1003.

Then, in step S1004, a color conversion process is performed which converts the image data, which contains values represented by RGB signals (8-bit (256-level) RGB values), into multi-valued data corresponding to each ink to be used in the printing. By this color conversion process, multi-valued data is generated which is represented by 8-bit (256-level) information specifying the tone of each ink in each pixel group formed of multiple pixels. This color conversion process is performed using a lookup table specifying the correspondence relationships between RGB values before conversion, and values represented by C, M, Y, and Bk signals corresponding to the colors of the respective color inks after conversion (C, M, Y, and Bk values) and values represented by reaction liquid signals (RCT values). For the reaction liquid, the lookup table to be used varies by the printing conditions set in step S1003. The relationships indicated by this lookup table will be described later with reference to FIGS. 11 and 12.

Then, in step S1005, a quantization process of quantizing the multi-valued data is performed. By this quantization process, quantized data is generated which is represented by 1-bit (2-level) information for each pixel and each ink specifying whether to eject or not to eject the ink. Dithering, error diffusion, or the like can be used as the method of this quantization.

Then, in step S1006, a distribution process of distributing the quantized data of each ink to the multiple scans in the multipass printing described above with reference to FIGS. 5 and 6 is performed. By this distribution process, print data is generated which is represented by 1-bit (2-level) information for each pixel and each ink specifying whether to eject or not to eject the ink in each of the multiple scans for each unit region on the printing medium.

While a configuration in which the CPU 301 in the printing apparatus 1 executes all of the processes of S1001 to S1006 has been described above, another configuration may be employed to execute the processes. For example, a configuration in which the PC 312 performs all of the processes of S1001 to S1006 may be employed. Alternatively, for example, a configuration may be employed in which the PC 312 executes the processes up to the color conversion process (S1004) and the printing apparatus 1 executes the quantization process (S1005) and the subsequent process.

Figure 11:
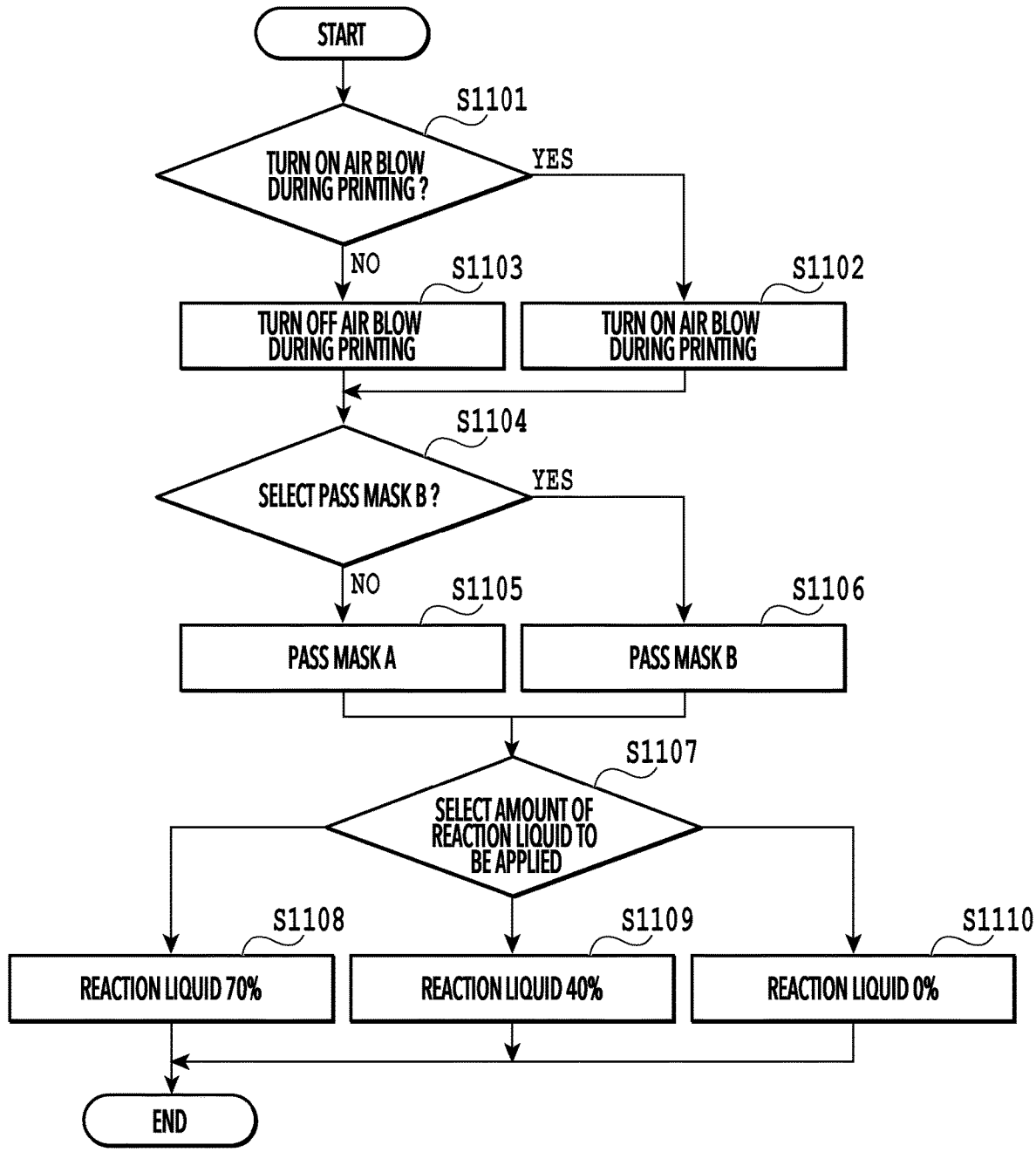
FIG. 11 is a flowchart illustrating a printing condition setting process performed in step S1003 in FIG. 10.

FIG. 11 is a flowchart illustrating the printing condition setting process performed in step S1003 described above.

In the present embodiment, first in step S1101, whether or not to blow air during the printing is identified based on the type of printing medium obtained in step S1002 (FIG. 10).

If the type of printing medium obtained in step S1002 is, for example, "coated paper" or one registered as "easily wettable printing medium" in the identification process to be described later with reference to FIG. 13 and subsequent drawings (see FIG. 9), the warm air blow by the air blow unit 10 is turned on (FIG. 1). This air blow will dry and thicken the inks and thus prevent bleeding of the inks. If, on the other hand, the obtained type of printing medium is, for example, "glossy paper", the air blow is turned off in step S1103.

Also, if the obtained type of printing medium is, for example, "plain paper" or one registered as "poorly absorbent printing medium" in the identification process (see FIG. 9), the air blow by the air blow unit 10 is turned on in step S1102. This will impair absorption of the moisture in the inks into the printing medium and thus prevent cockling of the printing medium. If the obtained type of printing medium is, for example, "vinyl chloride banner" or one registered as "non-absorbent printing medium" in the identification process (see FIG. 9), the air blow by the air blow unit 10 is turned off in step S1103.

Then, in step S1104, the pass mask to be used in the multipass printing is identified, specifically, whether the pass mask B is selected is judged, based on the type of printing medium obtained in step S1002, as in the identification in step S1101 described above. Note that the act of determining YES or NO will be described as "judge" herein.

If the obtained type of printing medium is, for example, "YUPO", the pass mask B is set as the mask to be used in step S1106. This will allow the reaction liquid and the color inks to be applied in the same scan. On the other hand, if the obtained type of printing medium is, for example, "vinyl chloride film", the pass mask A is set in step S1105. This will allow the reaction liquid to be applied to the printing medium beforehand in a scan preceding a scan for applying the color inks. Accordingly, the color inks and the reaction liquid will react with each other, causing aggregation, which will prevent bleeding.

If the obtained type of printing medium is, for example, "wallpaper" or one identified as "poorly absorbent printing medium" in the identification process, the pass mask B is set in step S1106. This will allow the reaction liquid and the color inks to be applied in the same scan and thus prevent the reaction liquid from being absorbed into the printing medium and failing to react with the color inks. If the obtained type of printing medium is, for example, "PP film" or one identified as "non-absorbent printing medium" in the identification process, the pass mask A is set in step S1105.

Then, in step S1107, the amount of the reaction liquid to be applied is identified based on the type of printing medium obtained in step S1002, as in the identification in step S1101 described above.

If the obtained printing medium is an easily wettable and non-absorbent printing medium, e.g., "YUPO", the amount of the reaction liquid to be applied is set to 70% in step S1108. As described above, in the case of a non-absorbent and easily wettable printing medium, the amount of the reaction liquid to be applied is increased as described above. This will allow the color inks to react with the reaction liquid and thus prevent bleeding. Note that, in the present embodiment, "amount to be applied" is represented as a duty (%) being the ratio of the pixels to which to apply the reaction liquid to the pixels forming the image.

If the obtained type of printing medium is, for example, a poorly wettable and non-absorbent printing medium, such "vinyl chloride film", the amount of the reaction liquid to be applied is set to 40% in step S1109.

If the obtained type of printing medium is, for example, a printing medium for inkjet printing, such as "glossy paper", or "plain paper", which is poorly absorbent, the amount of the reaction liquid to be applied is set to 0% in step S1110.

The identification of whether to turn on the air blow in step S1101, the identification of the pass mask in step S1104, and the identification of the amount of the reaction liquid to be applied in step S1107 are performed based on the combination of the wettability and absorbency of the printing medium. FIG. 12 is a diagram illustrating a relationship between the combination of the wettability and absorbency of each type of printing medium and the ON or OFF of the air blow, the pass mask A or B, and the amount of the reaction liquid to be applied according to the present embodiment. Specifically, FIG. 12 illustrates the table to be referred to in step S1003 in FIG. 10 (the process of FIG. 11).

As illustrated in FIG. 12, the table specifies the amount of the reaction liquid to be applied, ON or Off of the air blow, and the mask A or B for each of "vinyl chloride film", . . . "coated paper" (i.e., for each type of printing medium) already registered in the printing apparatus. Moreover, for each of printing media registered via the identification process to be described later with reference to FIG. 13 and subsequent drawings, the table specifies the amount of the reaction liquid to be applied, ON or Off of the air blow, and the mask A or B based on the printing conditions described above. For example, as described above with reference to FIG. 7, "A: easily-wettable/non-absorbent printing medium" is one identified and newly registered as an easily-wettable and non-absorbent printing medium. The table can specify the parameters of the printing conditions described above for "B: poorly wettable/non-absorbent printing medium", "C: easily wettable/poorly absorbent printing medium", "D: poorly wettable/poorly absorbent printing medium" as other combinations of wettability and absorbency.

<Identification of Fixation Characteristics of Printing Medium>

In the present embodiment, in a case of using an unregistered printing medium, the ink fixation characteristics of the printing medium are identified, and printing conditions are set as described above with reference to FIG. 11 based on the ink fixation characteristics. In the present embodiment, predetermined patterns are printed on the unregistered printing medium to be used by the user and their optical densities are measured to identify the ink fixation characteristics of the printing medium.

Figure 13:
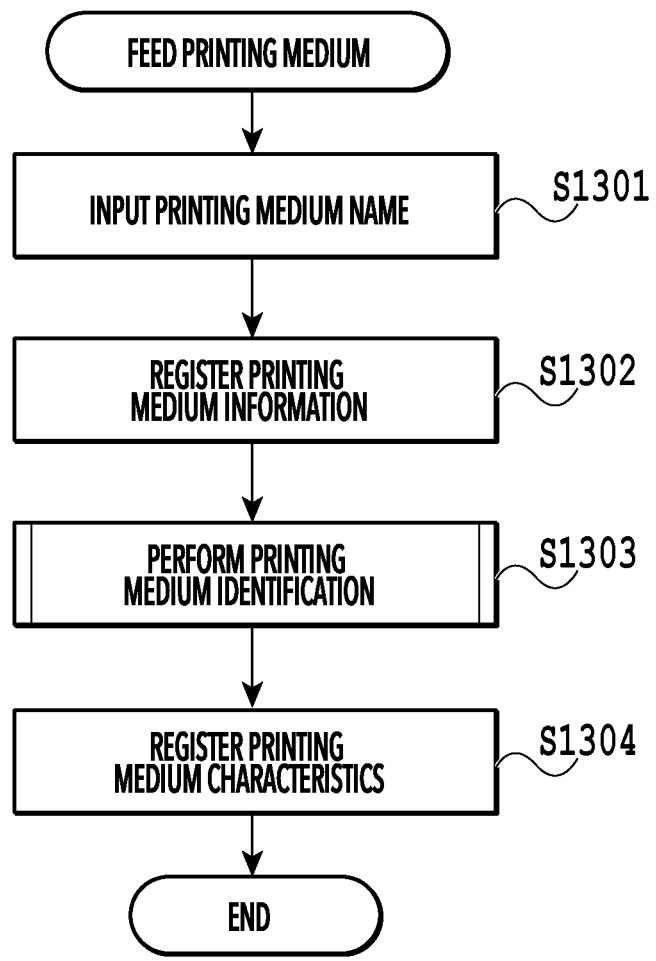
FIG. 13 is a flowchart illustrating a process of identifying and registering the ink fixation characteristics of a printing medium according to the first embodiment.

FIG. 13 is a flowchart illustrating a process of identifying the ink fixation characteristics of a printing medium and registering information on the identified fixation characteristics according to the present embodiment. The process illustrated in FIG. 13 is executed in a case where the user attempts to use a type of printing medium registered in the printing apparatus in advance. Specifically, this process is initiated in response to the user selecting an ink fixation characteristic identification sequence via the host PC 312 or an operation unit included in the main body of the printing apparatus.

First, in step S1301, a printing medium name of the printing medium to be used is input via the above operation unit. The printing medium name can be, for example, "A", as illustrated in FIG. 7, etc. In step S1302, this input printing medium name is registered in a predetermined memory, such as a ROM. Then, in step S1303, a process of identifying the fixation characteristics of the printing medium is performed, which will be described later in detail with reference to FIGS. 17 and 21. Lastly, in step S1304, the fixation characteristics of the printing medium are registered along with the printing medium name. For example, "A: easily-wettable/non-absorbent printing medium" is registered.

In the present embodiment, the ink fixation characteristics of a printing medium are specified based on the combination of the wettability and ink absorbency of the printing medium. In the present embodiment, this combination of wettability and absorbency is identified for each individual new printing medium to be used as mentioned above.

(Identification of Wettability)

Figure 14:
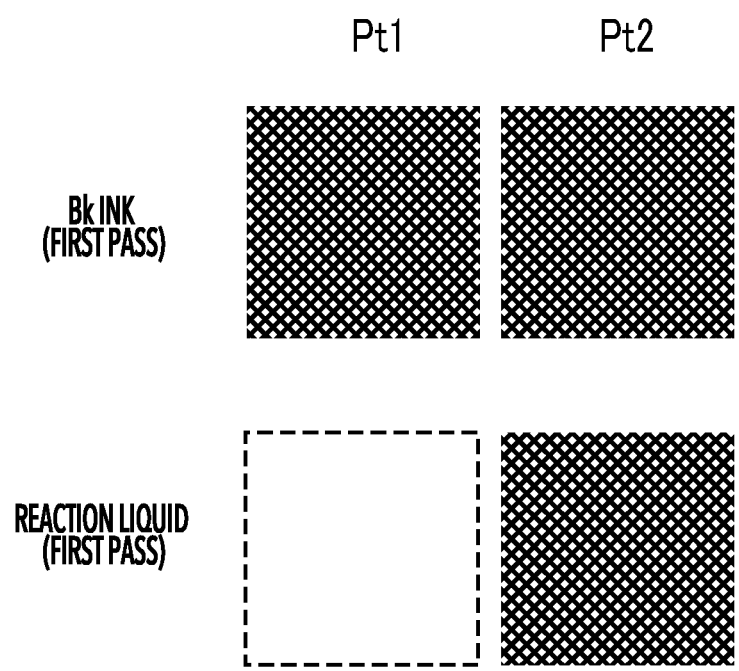
FIG. 14 is a diagram explaining test patterns to be printed in wettability identification according to the first embodiment.

FIG. 14 is a diagram explaining test patterns printed in wettability identification according to the present embodiment. Patterns of the black (Bk) ink and patterns of the reaction liquid are printed as the test patterns in the present embodiment. As will be described later with reference to FIGS. 15A and 15B, this is because the behaviors of the Bk ink and the reaction liquid in fixation differ depending on the wettability of the printing medium. Moreover, the following description related to the Bk ink similarly applies to the inks of the other colors (Y, M, and C). Thus, the Bk ink will be regarded as a representative color ink.

As illustrated in FIG. 14, in the test pattern printing, a pattern Pt1 is printed with only the Bk ink (the amount of the reaction liquid applied is zero) in a single scan of the print head 4. A pattern Pt2 is printed with the Bk ink and the reaction liquid placed one on top of the other in a single scan of the print head 4. More specifically, the pattern Pt1 is printed by ejecting the Bk ink at a duty of 50% onto 1200-dpi pixels forming the pattern and ejecting the reaction liquid at a duty of 0% (the amount to be applied is zero). The pattern Pt2 is printed by ejecting the reaction liquid and the Bk ink in this order each at a duty of 50% onto 1200-dpi pixels forming the pattern. Incidentally, although the reaction liquid is clear, the amount of the reaction liquid applied is represented by means of shading for convenience in FIGS. 15A and 15B. As described above, in the present embodiment, each pattern differs in the manner of application of the Bk ink and the reaction liquid. Note that, in the present embodiment, the amount of the reaction liquid to be applied is zero, but is not limited to this amount and may be substantially zero.

Figure 15A:
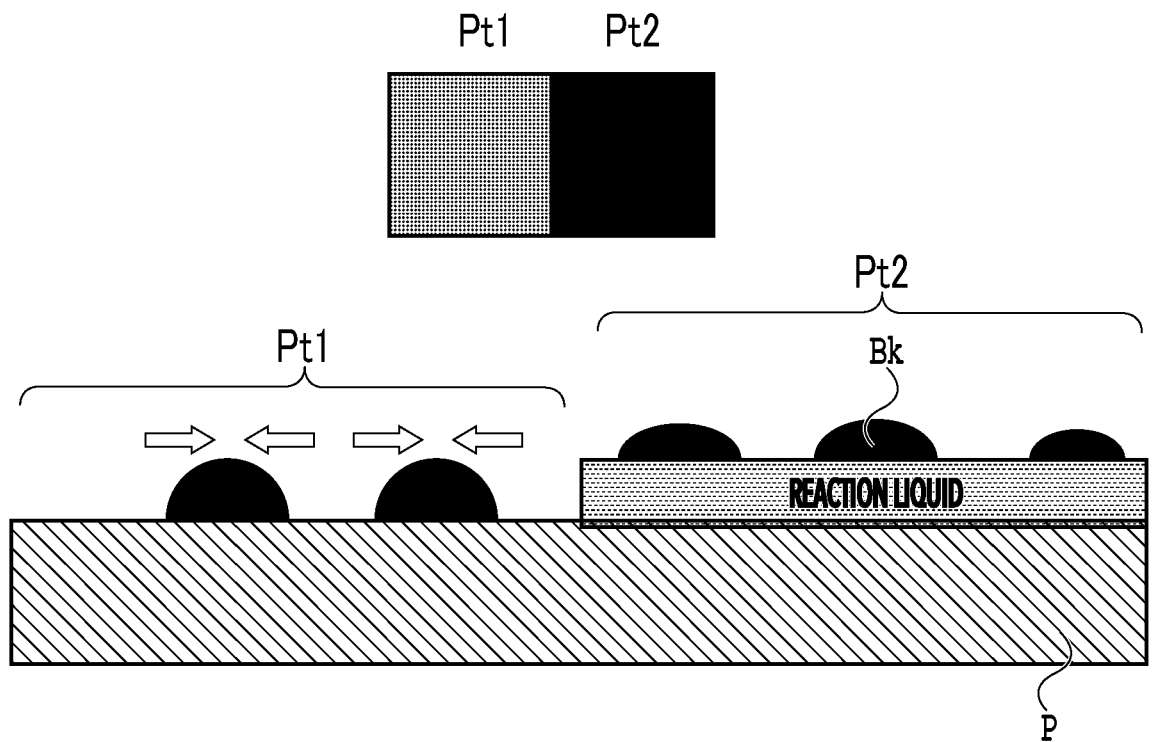
FIGS. 15A and 15B are diagrams explaining behaviors of an ink and the reaction liquid in fixation in a case of printing the patterns illustrated in FIG. 14 as well as their resulting optical densities.
Figure 15B:
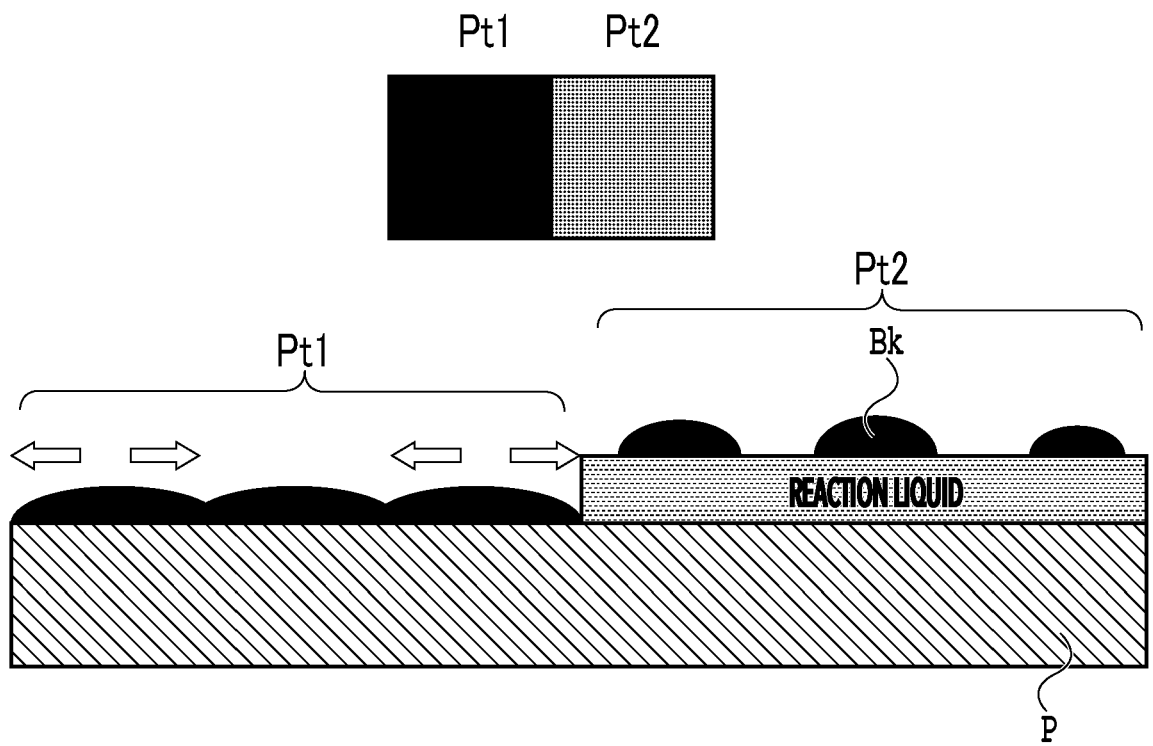

FIGS. 15A and 15B are diagrams explaining the behaviors of the ink and the reaction liquid in fixation in a case of printing the patterns illustrated in FIG. 14 as well as their resulting optical densities. FIG. 15A illustrates a case where the patterns are printed on a poorly wettable printing medium. FIG. 15B illustrates an example where the patterns are printed on an easily wettable printing medium.

As illustrated in FIG. 15A, in the case where the patterns are printed on a poorly wettable printing medium, the pattern Pt1 (first pattern), in which the reaction liquid is not applied, is such that the applied Bk ink does easily wets the printing medium and droplets of the Bk ink therefore contact and attract one another. This lowers the coverage of the Bk ink on the printing medium surface. On the other hand, the pattern Pt2 (second pattern), in which the reaction liquid is applied, is such that the Bk ink aggregates as a result of reacting with the reaction liquid applied before the Bk ink in the same scan. Hence, droplets of the ink do not attract one another. Accordingly, the coverage of the ink on the printing medium is higher in the pattern Pt2 than in the pattern Pt1, and the optical density of the pattern Pt2 is detected to be higher than that of the pattern Pt1, so that the pattern Pt2 has lower brightness (higher density).

On the other hand, in the case where the patterns are printed on the easily wettable printing medium illustrated in FIG. 15B, the pattern Pt1, in which the reaction liquid is not applied, is such that droplets of the Bk ink contact one another but do not attract one another and spread instead since they are easily wettable. This increases the coverage of the Bk ink, so that high optical density is detected. On the other hand, the pattern Pt2, in which the reaction liquid is applied, is such that the Bk ink does not spread due to the aggregation resulting from the reaction with the reaction liquid applied before the Bk ink. Accordingly, the coverage of the Bk ink is lower in the pattern Pt2 than in the pattern Pt1, and the optical density of the pattern Pt2 is detected to lower than that of the pattern Pt1, so that the pattern Pt2 has higher brightness (lower density).

Figure 16A:
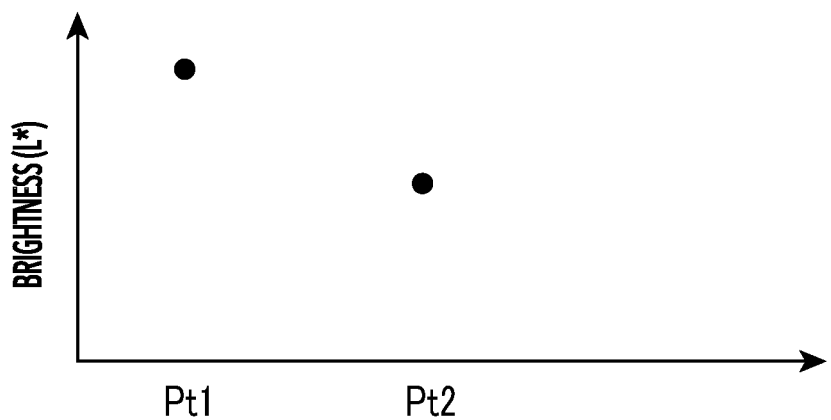
FIGS. 16A and 16B are diagrams illustrating the brightnesses explained in FIGS. 15A and 15B.
Figure 16B:
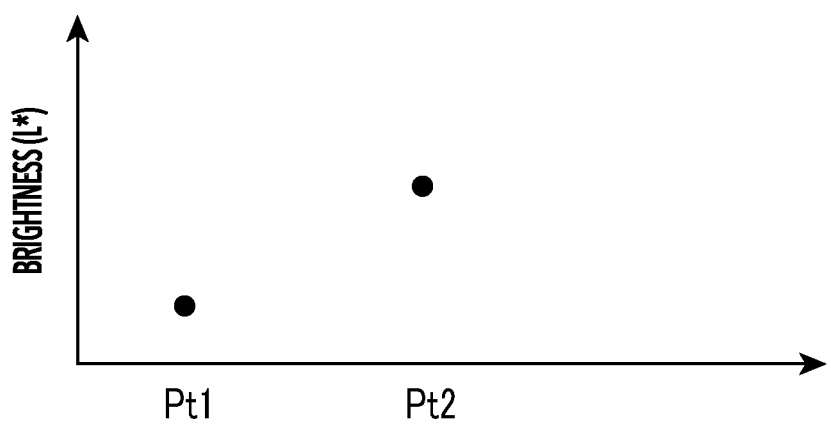

FIGS. 16A and 16B are diagrams illustrating the brightnesses explained in FIGS. 15A and 15B. FIG. 16A corresponds to the brightness explained in FIG. 15A. FIG. 16B corresponds to the brightness explained in FIG. 15B.

As illustrated in FIG. 16A, the patterns printed on the poorly wettable printing medium are such that the brightness of the pattern Pt2, in which the reaction liquid is applied, is lower than that of the pattern Pt1, in which the reaction liquid is not applied. On the other hand, as illustrated in FIG. 16B, the patterns printed on the easily wettable printing medium are such that the brightness of the pattern Pt2, in which the reaction liquid is applied, is higher than that of the pattern Pt1, in which the reaction liquid is not applied.

As described above, the patterns Pt1 and Pt2 illustrated in FIG. 14 are printed on a printing medium. Whether the printing medium on which these patterns are printed is poorly wettable or easily wettable can be identified based on the relative relationship in optical density or brightness between the patterns (between a first density or brightness and a second density or brightness) (i.e., which density or bright is higher).

Figure 17:
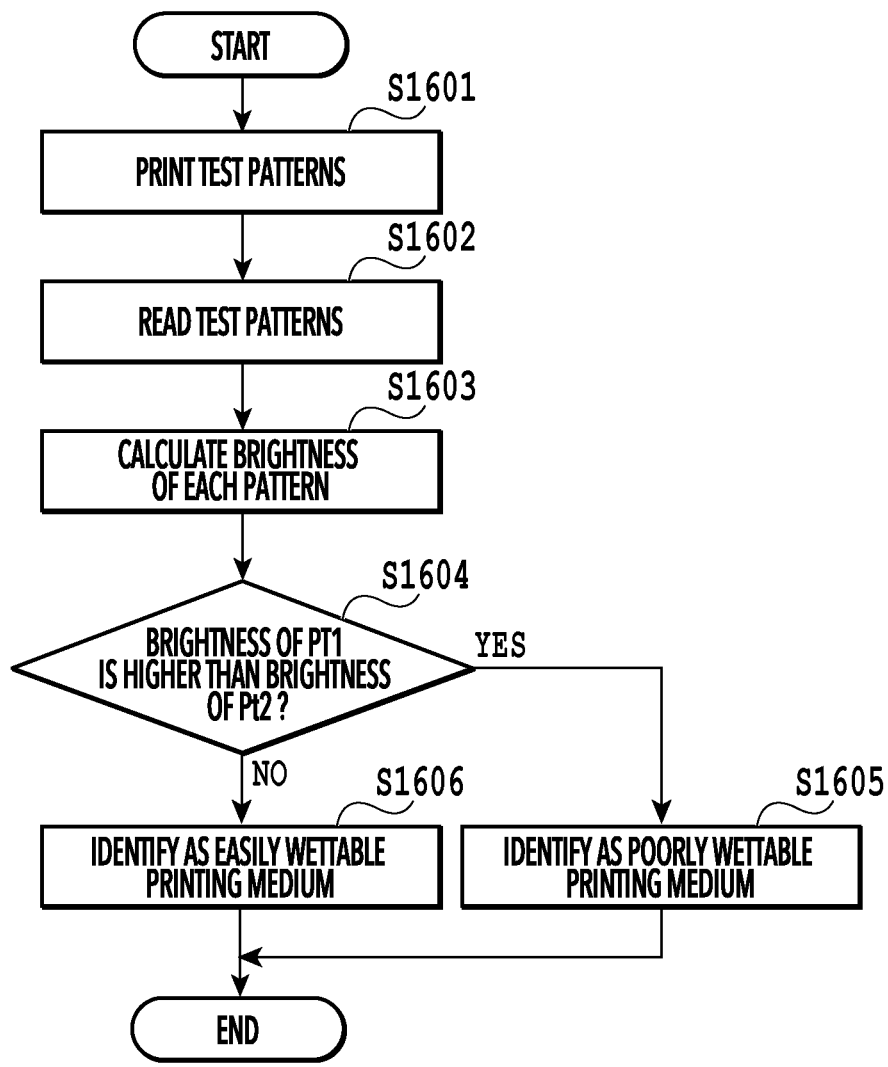
FIG. 17 is a flowchart illustrating a process of identifying the wettability of a printing medium according to the first embodiment.

FIG. 17 is a flowchart illustrating the process of identifying the wettability of a printing medium according to the present embodiment described above.

First, in step S1601, the test patterns Pt1 and Pt2 for the wettability identification described above with reference to FIG. 14 are printed on the identification-target printing medium. Then, in step S1602, the densities of the printed test patterns are detected with the optical sensor 2. Thereafter, in step S1603, the brightnesses of the patterns Pt1 and Pt2 are calculated from their detected densities (bright obtaining or density obtaining). After that, in step S1604, it is judges whether the brightness of the pattern Pt1 is higher than the brightness of the pattern Pt2.

If the brightness of the pattern Pt1 is higher, the identification-target printing medium is identified to be poorly wettable and registered as a poorly wettable printing medium in step S1605. The type of the printing medium is registered in combination with the result of the absorbency identification to be described later with reference to FIG. 21. The same applies below. If the brightness of the pattern Pt1 is lower, the identification-target printing medium is identified to be easily wettable and registered as an easily wettable printing medium in step S1606. This process ends after these steps S1605 and S1606.

As described above, according to the present embodiment, the wettability of a printing medium can be identified. Thus, even in a case where the wettability of a printing medium varies from one brand to another or in a case of using a type of printing medium that has not been registered in advance, it is possible to set printing conditions suitable for the wettability of that printing medium.

In the example described above, the pattern Pt1 is a pattern in which the reaction liquid is not applied. However, applying a small amount of the reaction liquid can still lead to a result similar to what has been described above, that is, ink droplets attract one another on a poorly wettable printing medium whereas ink droplets spread on an easily wettable printing medium. The pattern Pt1 is therefore not limited to a pattern in which the reaction liquid is not applied. Moreover, in the example described above, an optical sensor is used to measure the brightness, but the present embodiment is not limited to this example. For instance, the user may visually detect the density difference between the patterns and set the wettability of the printing medium via the operation unit. In this case, the patterns Pt1 and Pt2 are desirably adjacent to each other so that the user can easily recognize the density difference. Furthermore, in a case where the brightness difference between the patterns Pt1 and Pt2 is within a certain range, the type of the printing medium may be identified as a paper for inkjet printing. For the optical sensor, a threshold for distinguishing a poorly wettable printing medium and an easily wettable printing medium may be set with the error in detection value taken into account. Specifically, provided that the error in detection value is within a certain range, the optical sensor identifies that the density of the pattern Pt1 is high in a case where the brightness difference between the patterns Pt1 and Pt2 is a certain value or more. The optical sensor identifies that the density of the pattern Pt1 is low in a case where the brightness difference between the patterns Pt1 and Pt2 is less than the certain value.

(Identification of Absorbency)

Figure 18:
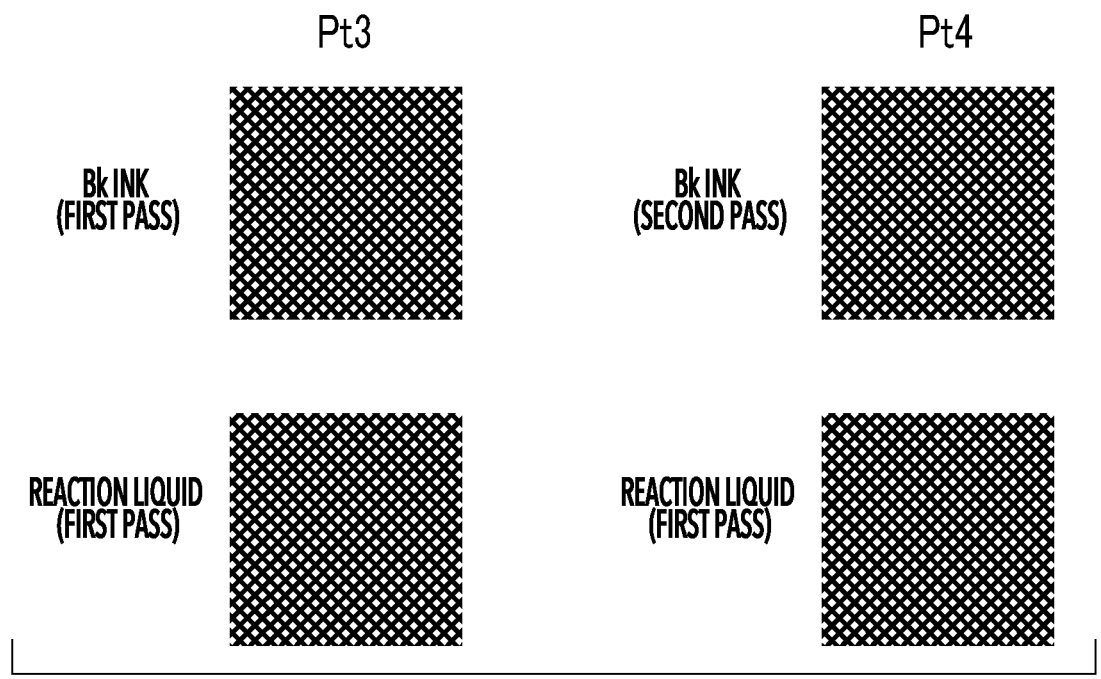
FIG. 18 is a diagram explaining test patterns to be printed in absorbency identification according to the first embodiment.

FIG. 18 is a diagram explaining test patterns printed in absorbency identification according to the present embodiment. Patterns of the black (Bk) ink, as a representative color ink, and patterns of the reaction liquid are printed as the test patterns in the present embodiment.

As illustrated in FIG. 18, a pattern Pt3 is printed with the Bk ink and the reaction liquid placed one on top of the other in the same single scan of the print head 4. A pattern Pt4 is printed by ejecting the reaction liquid in the first scan of the print head 4 and ejecting the Bk ink in the second scan. More specifically, the pattern Pt3 is printed by ejecting the Bk ink and the reaction liquid each at a duty of 50% onto 1200-dpi pixels forming the pattern. The pattern Pt4 is printed by ejecting the reaction liquid in the first scan and ejecting the Bk ink in the second scan each at a duty of 50 onto 1200-dpi pixels forming the pattern. Incidentally, although the reaction liquid is clear, the amount of the reaction liquid applied is represented by means of shading for convenience in FIG. 18.

Figure 19A:
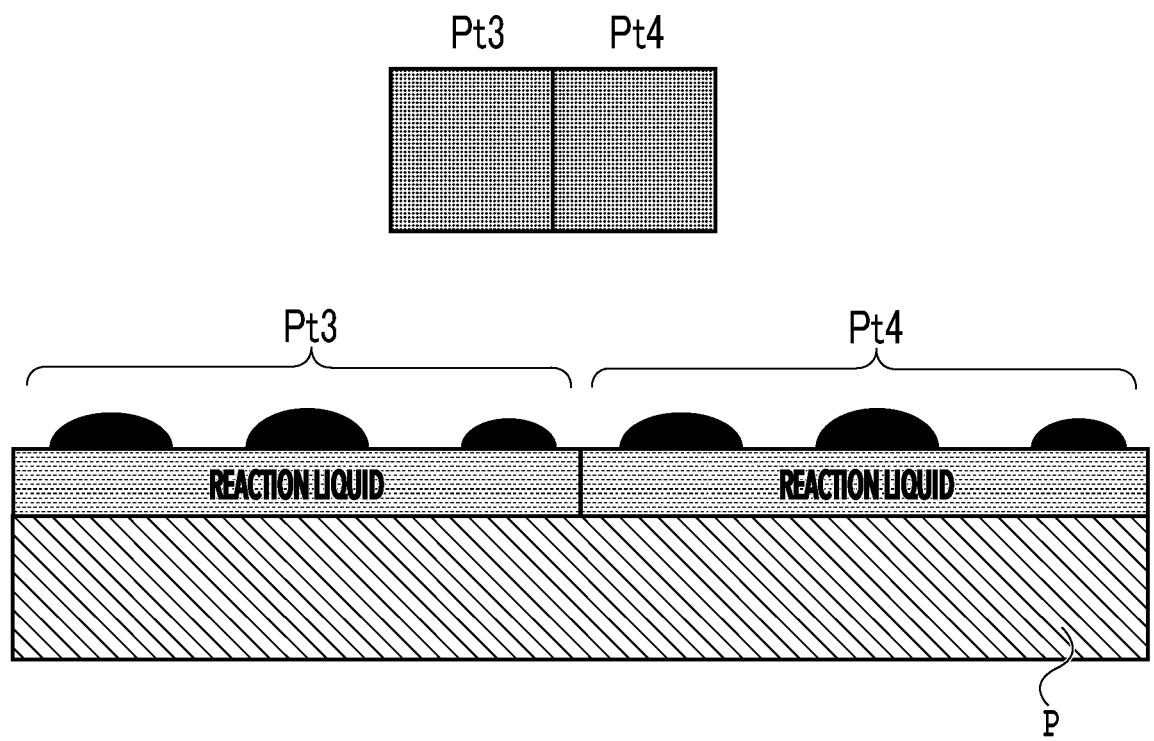
FIGS. 19A and 19B are diagrams explaining behaviors of an ink and the reaction liquid in fixation in a case of printing the patterns illustrated in FIG. 18 as well as their resulting optical densities.
Figure 19B:
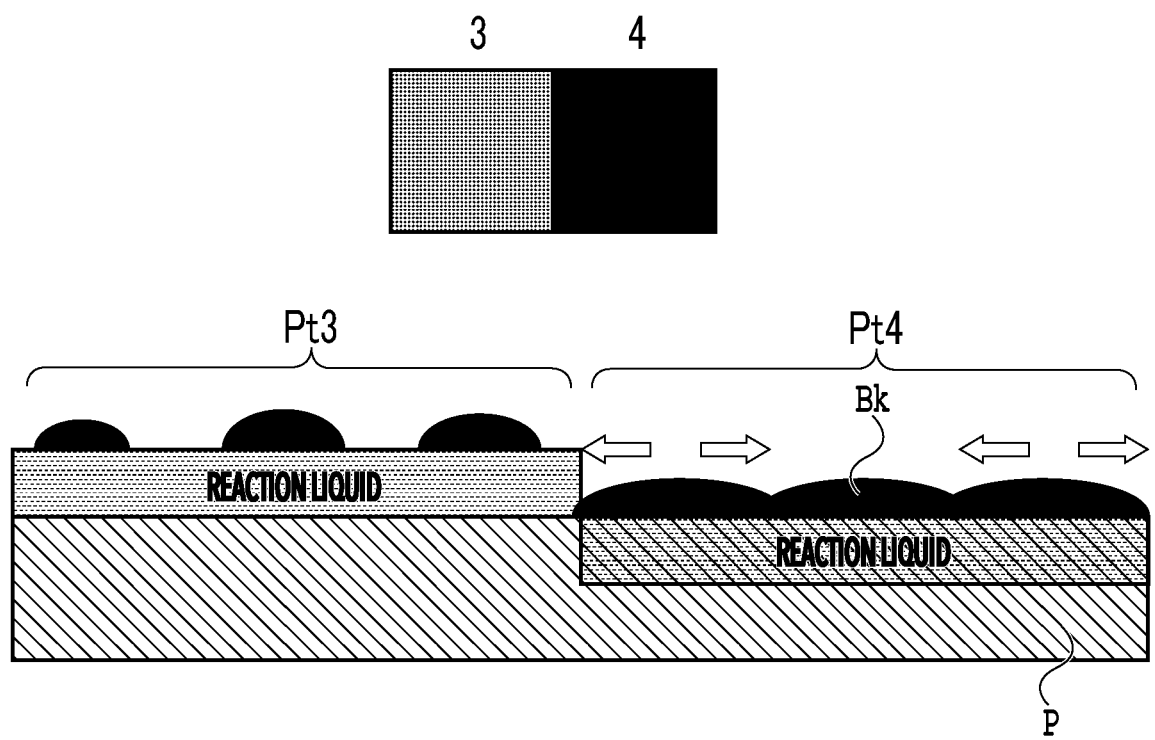

FIGS. 19A and 19B are diagrams explaining the behaviors of the ink and the reaction liquid in fixation in a case of printing the patterns illustrated in FIG. 18 as well as their resulting optical densities. FIG. 19A illustrates a case where the patterns are printed on a non-absorbent printing medium. FIG. 19B illustrates an example where the patterns are printed on a poorly absorbent printing medium.

As illustrated in FIG. 19A, in the case where the patterns are printed on a non-absorbent printing medium, the pattern Pt3, which is formed by ejecting and applying the reaction liquid and the Bk ink in the same scan, is such that the reaction liquid and the Bk ink react with each other as soon as being applied to the printing medium, so that the Bk ink aggregates and does not spread. The pattern Pt4, which is formed by applying the reaction liquid in the first scan and then applying the Bk ink in the second scan, is such that the reaction liquid is present on the printing medium before the Bk ink is applied, since the printing medium is non-absorbent. For this reason, with the pattern Pt4 too, the Bk ink reacts with the reaction liquid, so that the Bk ink aggregates and does not spread. Accordingly, the coverage of the Bk ink on the printing medium is substantially equal between the patterns Pt3 and Pt4. On the other hand, as illustrated in FIG. 19B, in the case of printing the patterns on a poorly absorbent printing medium, the pattern Pt3, which is formed by applying the reaction liquid and the Bk ink in the same scan, is such that the Bk ink reacts with the reaction liquid, so that the Bk ink aggregates and does not spread, as in the case with a non-absorbent printing medium described above. However, the pattern Pt4, which is formed by applying the reaction liquid in the first scan and then applying the Bk ink in the second scan, is such that the reaction liquid applied first has permeated the printing medium and is therefore not present on the printing medium. Thus, the Bk ink cannot react with the reaction liquid and therefore does not aggregate, which allows the Bk ink to spread. Accordingly, the coverage of the Bk ink on the printing medium is higher with the pattern Pt4 than with the pattern Pt3.

In the above description, the Bk ink in the pattern Pt4 spreads in the case of a poorly absorbent printing medium. However, the consequence is not limited to this case. Droplets of the Bk ink may attract one another. Whether droplets of the Bk ink spread or attract one another depends on the surface free energy that changes when the reaction liquid permeates the printing medium. Thus, there is a case where droplets of the Bk ink attract one another instead of spreading. For this reason, the printing medium is identified as a non-absorbent printing medium in a case where the patterns Pt3 and Pt4 have substantially equal density or brightness, and is identified as a poorly absorbent printing medium in a case where there is a density or brightness difference between the patterns Pt3 and Pt4.

Figure 20A:
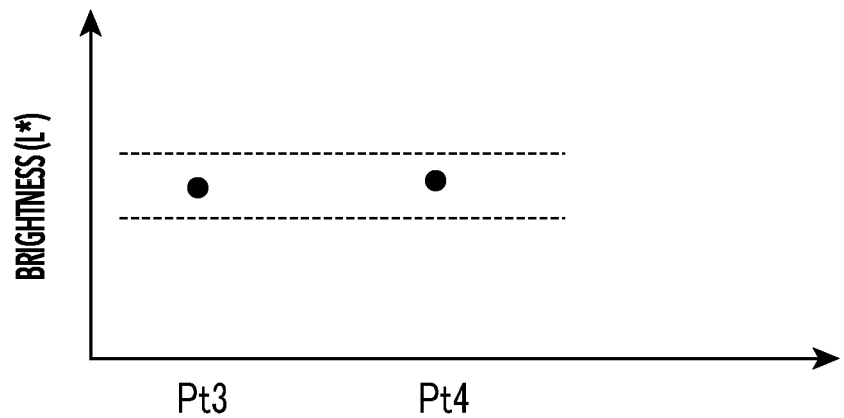
FIGS. 20A and 20B are diagrams illustrating the brightnesses explained in FIGS. 19A and 19B.
Figure 20B:
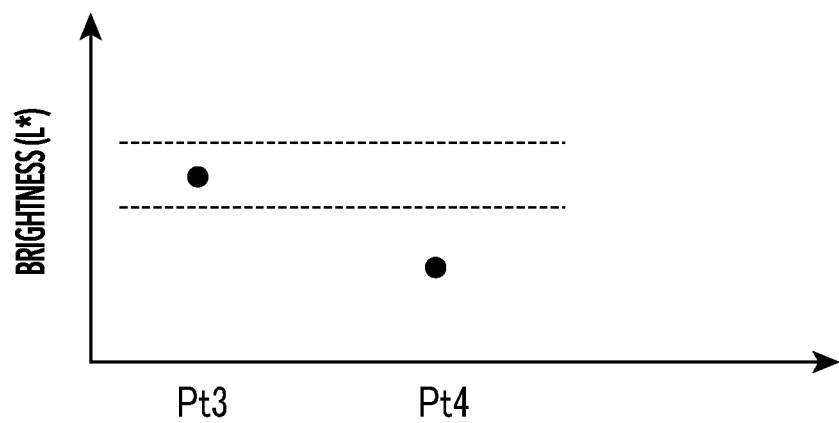

FIGS. 20A and 20B are diagrams illustrating the brightnesses explained in FIGS. 19A and 19B. FIG. 20A corresponds to the brightness explained in FIG. 19A. FIG. 20B corresponds to the brightness explained in FIG. 19B.

As illustrated in FIG. 20A, the patterns printed on a non-absorbent printing medium are such that the brightness is substantially equal between the pattern Pt3, which is formed by applying the reaction liquid and the Bk ink in the same scan, and the pattern Pt4, which is formed by applying the reaction liquid and the Bk ink in different scans, i.e., applying the reaction liquid and the Bk ink with a certain time interval between them. On the other hand, as illustrated in FIG. 20B, the patterns printed on a poorly absorbent printing medium are such that the brightness of the pattern Pt3, which is formed by applying the reaction liquid and the Bk ink in the same scan, is higher than that of the pattern Pt4, which is formed by applying the reaction liquid and the Bk ink in different scans, i.e., applying the reaction liquid and the Bk ink with a certain time interval between them.

Figure 21:
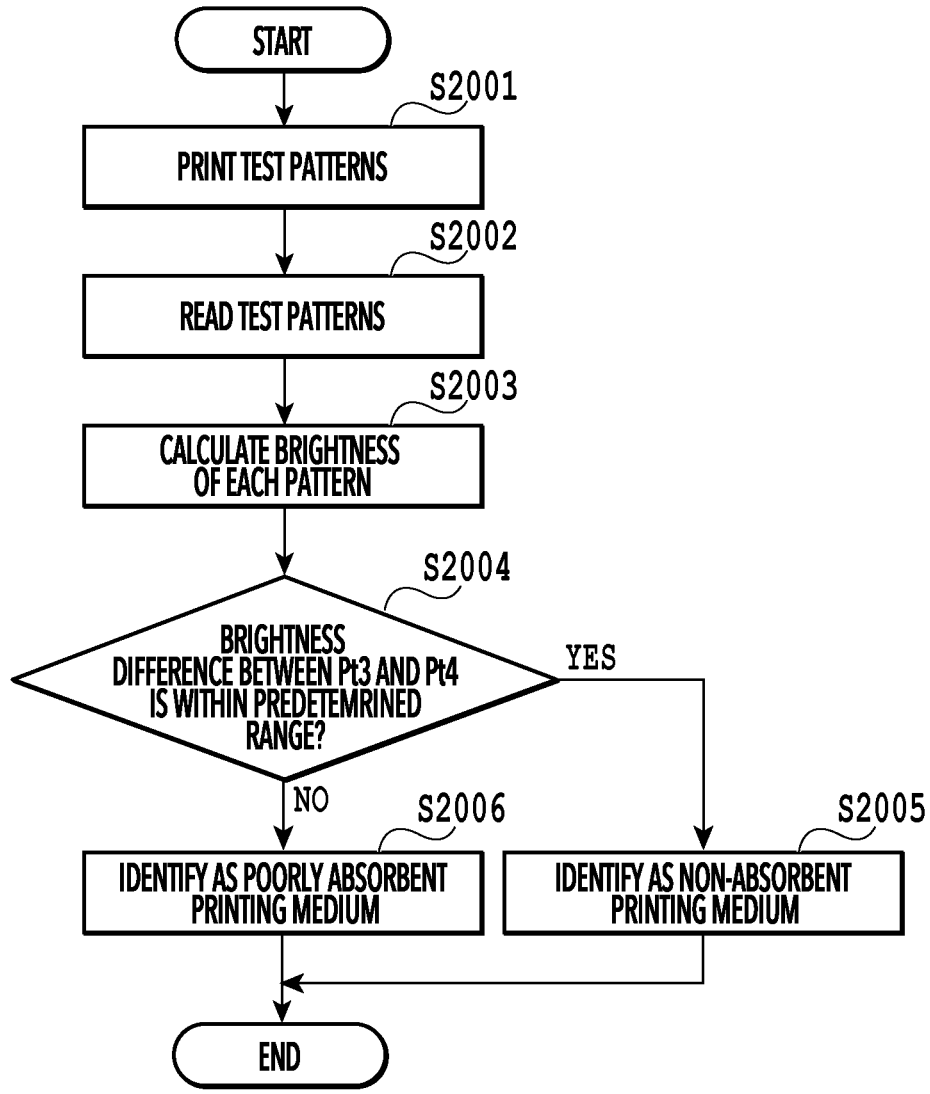
FIG. 21 is a flowchart illustrating a process of identifying the wettability of a printing medium according to the first embodiment.

FIG. 21 is a flowchart illustrating the process of identifying the absorbency of a printing medium according to the present embodiment described above.

First, in step S2001, the test patterns Pt3 and Pt4 for the absorbency identification described above with reference to FIG. 18 are printed on the identification-target printing medium. Then, in step S2002, the densities of the printed test patterns are detected with the optical sensor 2. Then, in step S2003, the brightnesses of the patterns Pt3 and Pt4 are calculated from their detected densities. After that, in step S2004, it is judged whether or not the difference between the brightness of the pattern Pt3 and the brightness of the pattern Pt4 is within a predetermined range.

If it is judged in step S2004 that the brightness difference is within the predetermined range, the printing medium is identified as a non-absorbent printing medium and registered as "non-absorbent printing medium" in step S2005 (FIG. 12). On the other hand, if it is judged that the brightness difference is not within the predetermined range, the printing medium is identified as a poorly absorbent printing medium and registered as "poorly absorbent printing medium" in step S2006 (FIG. 12). The above predetermined range is such a range that the brightnesses of the two patterns are substantially equal, and can be set based on brightnesses obtained from the above patterns printed on the existing non-absorbent printing media and poorly absorbent printing media registered in advance, for example.

As described above, according to the present embodiment, whether an unregistered printing medium to be used is non-absorbent or poorly absorbent can be identified. Thus, even in a case where the absorbency of a printing medium varies from one brand to another or in a case of using a type of printing medium that has not been registered in advance, it is possible to set printing conditions suitable for the wettability of that printing medium (non-absorbent or poorly absorbent).

In the present embodiment too, instead of using a sensor to detect the optical densities, the user may visually check the density difference to identify whether the printing medium is non-absorbent or poorly absorbent, and perform a registration operation. In this case, the patterns Pt3 and Pt4 are likewise desirably adjacent to each other so that the user can easily recognize the density difference.

The present embodiment described above is directed to a serial-scan printing apparatus, which performs printing by alternately scanning a print head and conveying a printing medium. However, the technology of the present disclosure is also applicable to full-line printing apparatuses, which perform printing by conveying a printing medium without scanning a print head, by causing these printing apparatuses to print the patterns Pt1, Pt2, Pt3, and Pt4. In this case, the pattern Pt4 can be obtained by applying the reaction liquid and the Bk ink while holding the conveyance of the printing medium for a predetermined time corresponding to a time difference equal to a single scan for the application of the reaction liquid and the Bk ink.

As described above, the ink fixation characteristics to be identified are the combination of wettability and absorbency, but the application of the present disclosure is not limited to this case. For example, the ink fixation characteristics may be either the wettability or absorbency of the printing medium. With this taken into account, at least one of wettability or absorbency is identified in the present disclosure.

Second Embodiment

A second embodiment will be described below. In the following, description of the same contents as in the first embodiment will be omitted as appropriate, and differences from the first embodiment will be mainly described.

The present embodiment is a variation of the process of identifying the ink fixation characteristics of a new printing medium and registering the printing medium illustrated in FIG. 13. Specifically, whether to perform the printing medium identification (S1303) is determined based on the user's manual choice.

Figure 22:
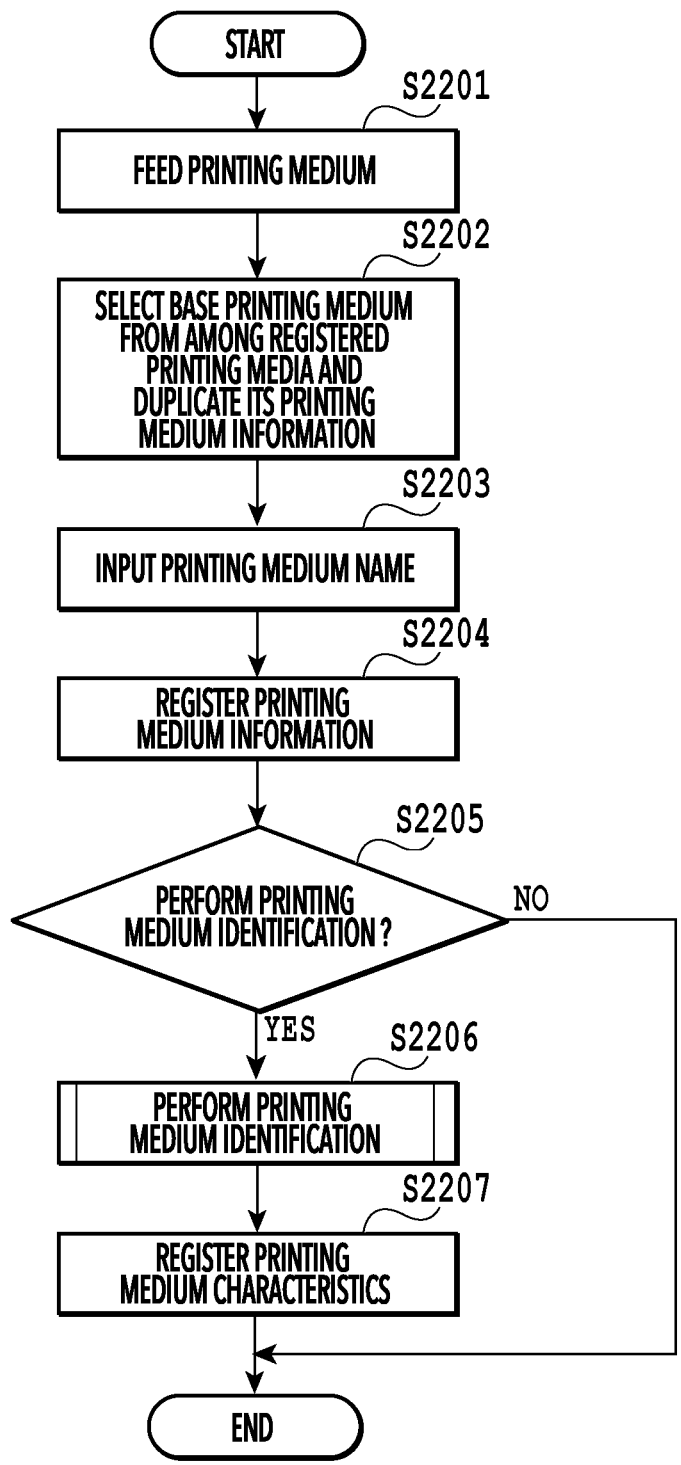
FIG. 22 is a flowchart illustrating a process of identifying the ink fixation characteristics of a printing medium and registering the printing medium characteristics according to a second embodiment.

FIG. 22 is a flowchart illustrating a process of identifying and registering the ink fixation characteristics of a printing medium according to the present embodiment, and is a flowchart being the series of processes illustrated in FIG. 13 to which a process of determining whether to perform printing medium identification based on a manual choice and the like are added.

First, in step S2201, a printing medium is fed. Then, in step S2202, a printing medium as a base is selected from among the multiple printing media registered as the printing medium types listed in FIG. 12, and the printing medium information corresponding to the selected printing medium is duplicated. In step S2203, the user is prompted to input a printing medium name (similar to step S1301). In step S2204, printing medium information is registered (similar to step S1302). By this step S2204, printing conditions and printing medium characteristics of the selected base printing medium are registered.

Then, in step S2205, whether to perform printing medium identification is judged based on the user's manual choice. If it is judged in this step that printing medium identification is to be performed, the process proceeds to step S2206. On the other hand, if it is judged in this step that printing medium identification is not to be performed, the series of processes is terminated.

In step S2206, printing medium identification is performed. Specifically, the wettability and ink absorbency of the printing medium as its ink fixation characteristics are identified.

In step S2207, information on the printing medium characteristics, which are the wettability and ink absorbency of the printing medium, is updated and registered. In this step, "0" or "1" indicated by a wettability flag is registered as information on the wettability, which is a fixation characteristic. The wettability flag indicates "0" as being poorly wettable and "1" as being easily wettable. Also, "0", "1", or "2" indicated by an absorbency flag is registered as information on the ink absorbency, which is a fixation characteristic. The absorbency flag indicates "0" as being non-absorbent, "1" as being poorly absorbent, and "2" as a sheet for inkjet printing.

FIG. 23A is a diagram illustrating relationships between the printing conditions for the pre-registered existing types of printing media listed in FIG. 12, and the wettability flag and the absorbency flag registered as information on the printing medium characteristics. FIG. 23B is a diagram illustrating relationships between the printing conditions for the types of printing media registered as new printing media listed in FIG. 12, and the wettability flag and the absorbency flag registered as information on the printing medium characteristics. Also, the items "amount of reaction liquid to be applied", "air blow during printing", and "mask" listed in FIGS. 23A and 23B indicate recommended printing conditions (hereinafter "recommended conditions") associated with information on the printing medium characteristics of each printing medium which are its wettability and ink absorbency obtained by printing medium identification. The method of applying the printing conditions of "amount of reaction liquid to be applied", "air blow during printing", and "mask" for the registered types of printing media listed in FIGS. 12, 23A, and 23B is not limited to the printing condition setting process illustrated in FIG. 11. In the present embodiment, in the printing medium characteristic registration in step S2207, the recommended conditions associated with the information on the printing medium characteristics are updated and registered as well. If it is judged in step S2205 that printing medium identification is not to be performed, the information on the printing conditions and the printing medium characteristics of the selected base printing medium registered in step S2204 is left as registered.

By employing the configuration described above, in a case where a base printing medium is selected and registered from among printing media registered as known printing media whose printing medium characteristics have been figured out in advance (see FIG. 23B), it is possible to keep printing medium identification from being performed based on a manual choice. This eliminates the time that would otherwise be required for the printing medium identification as well as the costs of the printing medium and the inks that would otherwise be required due to the printing on the printing medium in the printing medium identification. In a case of using an unknown printing medium too, it is possible to shorten the time required to register the printing medium by not performing printing medium identification based on a manual choice.

Next, a description will be given of a case of tentatively (temporarily) skipping printing medium identification in printing medium registration and, after the printing medium registration, obtaining information on the printing medium characteristics of the printing medium which are its wettability and ink absorbency by printing medium identification and registering the information. In the following, a description will be exemplarily given of a configuration capable of performing printing medium identification in printing medium editing based on a manual choice.

Figure 24:
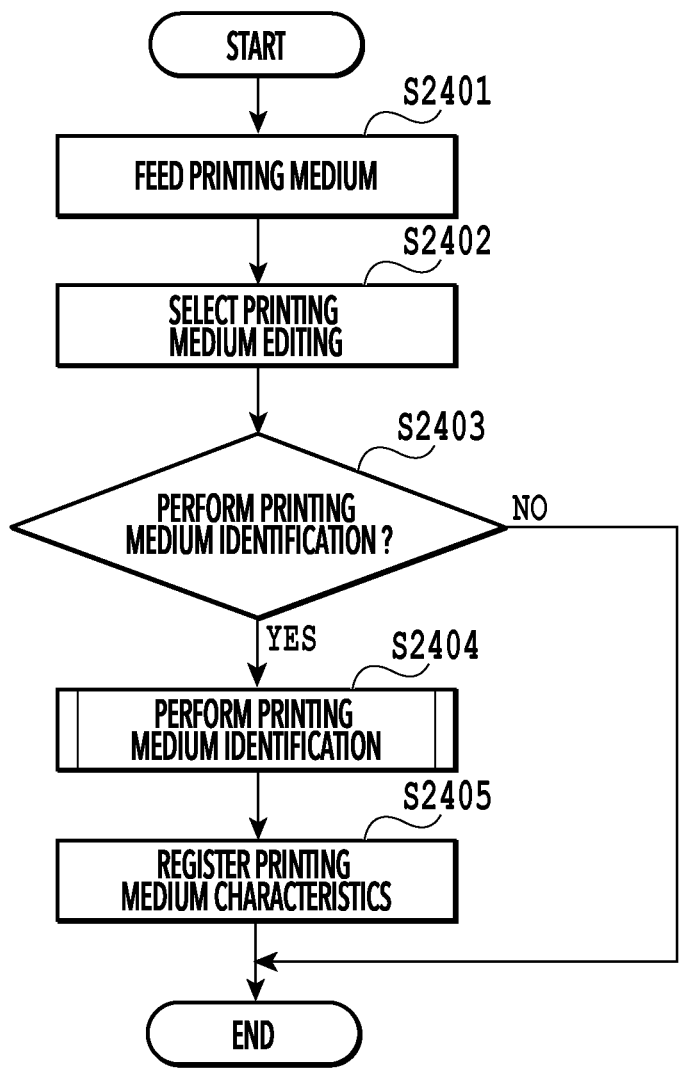
FIG. 24 is a flowchart illustrating a process of identifying and registering the ink fixation characteristics of a printing medium in a case where printing medium editing is selected according to the second embodiment.

FIG. 24 is a flowchart illustrating a process of identifying and registering the ink fixation characteristics of a printing medium according to the present embodiment, and is a flowchart of a series of registration processes including a process of determining whether to perform printing medium identification in printing medium editing based on a manual choice.

First, in step S2401, a printing medium is fed. Then, in step S2402, the user selects printing medium editing.

In step S2403, whether to perform printing medium identification is judged based on the user's manual choice. Specifically, whether to perform printing medium identification is judged based on the user's choice input via a graphical user interface (GUI) screen for the selected printing medium editing. If it is judged in this step that printing medium identification is to be performed, the process proceeds to step S2404. On the other hand, if it is judged in this step that printing medium identification is not to be performed, the series of processes ends without updating the information on the printing conditions and the printing medium characteristics of the printing medium that have already been registered.

In step S2404, printing medium identification is performed. Specifically, the wettability and ink absorbency of the printing medium as its ink fixation characteristics are identified.

In step S2405, the information on the printing medium characteristics, which are the wettability and ink absorbency of the printing medium, is updated and registered.

By employing the configuration described above, even in a case where printing medium identification was tentatively (temporarily) skipped in printing medium registration, the user can select printing medium editing and perform printing medium identification based on the user's manual choice.

Third Embodiment

In a third embodiment, information on whether printing medium identification has or has not been performed is stored in the ROM 302 or the RAM 303 and, based on this information, printing medium identification is kept from being repeated in a case where printing medium identification has been performed.

In the present embodiment, a wettability flag is provided which indicates information on the wettability of a printing medium and also information on whether printing medium identification has or has not been performed. This wettability flag indicates "0" as a state where printing medium identification has not been performed and the printing medium is poorly wettable. The wettability flag indicates "1" as a state where printing medium identification has been performed and the printing medium is poorly wettable. The wettability flag indicates "2" as a state where printing medium identification has not been performed and the printing medium is easily wettable. The wettability flag indicates "3" as a state where printing medium identification has been performed and the printing medium is easily wettable.

In the present embodiment, an absorbency flag is also provided which, like the wettability flag, indicates information on ink absorbency and also information on whether printing medium identification has or has not been performed. This absorbency flag indicates "0" as a state where printing medium identification has not been performed and the printing medium is non-absorbent. The absorbency flag indicates "1" as a state where printing medium identification has been performed and the printing medium is non-absorbent. The absorbency flag indicates "2" as a state where printing medium identification has not been performed and the printing medium is poorly absorbent. The absorbency flag indicates "3" as a state where printing medium identification has been performed and the printing medium is poorly absorbent. The absorbency flag indicates "4" as a state where printing medium identification has not been performed and the printing medium is highly absorbent (paper for inkjet printing or the like). The absorbency flag indicates "5" as a state where printing medium identification has been performed and the printing medium is highly absorbent (paper for inkjet printing or the like).

Figure 25:
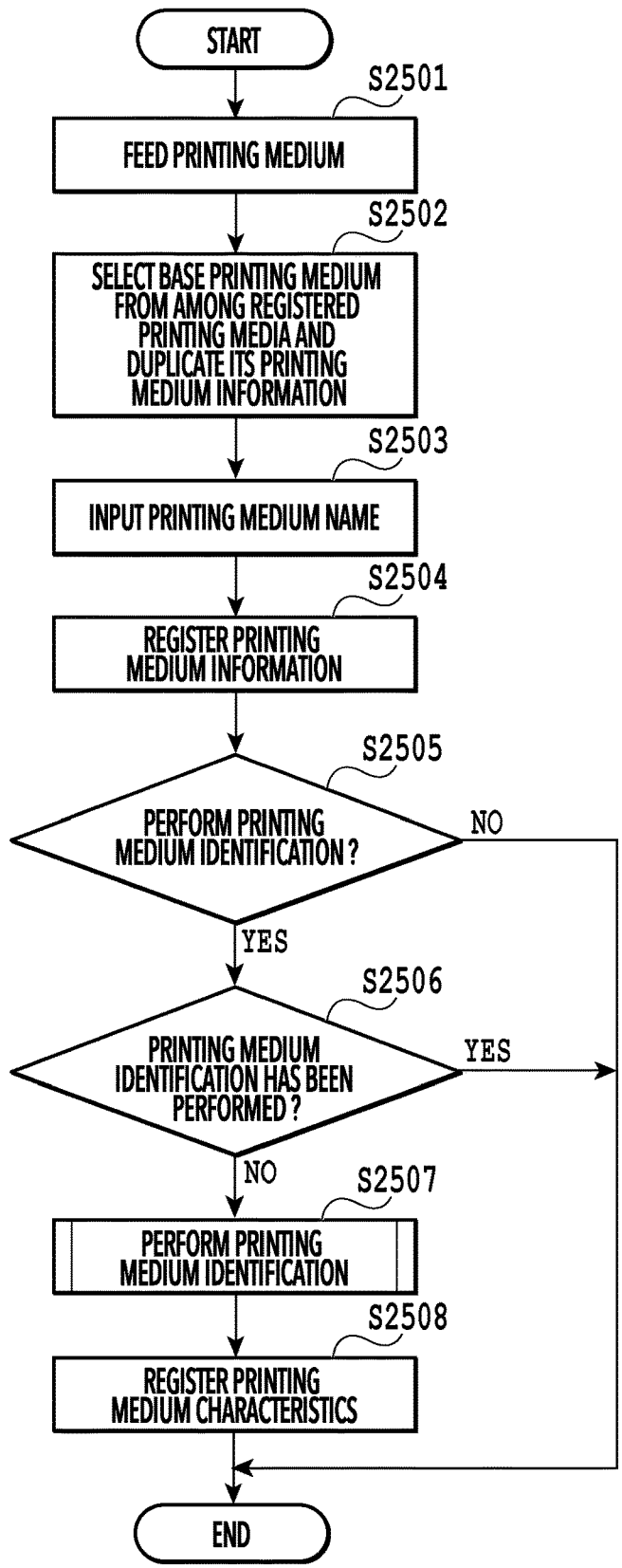
FIG. 25 is a flowchart illustrating a process of identifying and registering the ink fixation characteristics of a printing medium according to a third embodiment.

FIG. 25 is a flowchart illustrating a process of identifying and registering the ink fixation characteristics of a printing medium according to the present embodiment, and is a flowchart being the series of processes illustrated in FIG. 22 to which is added a process of judging whether printing medium identification has or has not been performed.

Steps S2501 to S2505 in FIG. 25 are the same as steps S2201 to S2205 in FIG. 22. Moreover, steps S2507 and S2508 in FIG. 25 are the same as steps S2206 and S2207 in FIG. 22.

In step S2506 in FIG. 25, whether printing medium identification has or has not been performed is judged. If the wettability flag is "1" or "3" and the absorbency flag is "1", "3", or "5", the result of this judgment is "Yes (performed)", and the series of processes ends. On the other hand, if the wettability flag is "0" or "2" and the absorbency flag is "0", "2", or "4", the result of the judgment is "No (not performed)", and the process proceeds to step S2507.

By employing the configuration described above, printing medium identification is not performed in a case where printing medium identification has already been performed on the base printing medium. This eliminates the time that would otherwise be required for the printing medium identification as well as the costs of the printing medium and the inks that would otherwise be required due to the printing on the printing medium in the printing medium identification.

Next, a configuration as a variation of the present embodiment will be described in which information on whether printing medium identification has or has not been performed is stored in the RAM 303 or the like and, in a case where printing medium editing is selected, printing medium identification is kept from being repeated based on the above information if printing medium identification has been performed.

Figure 26:
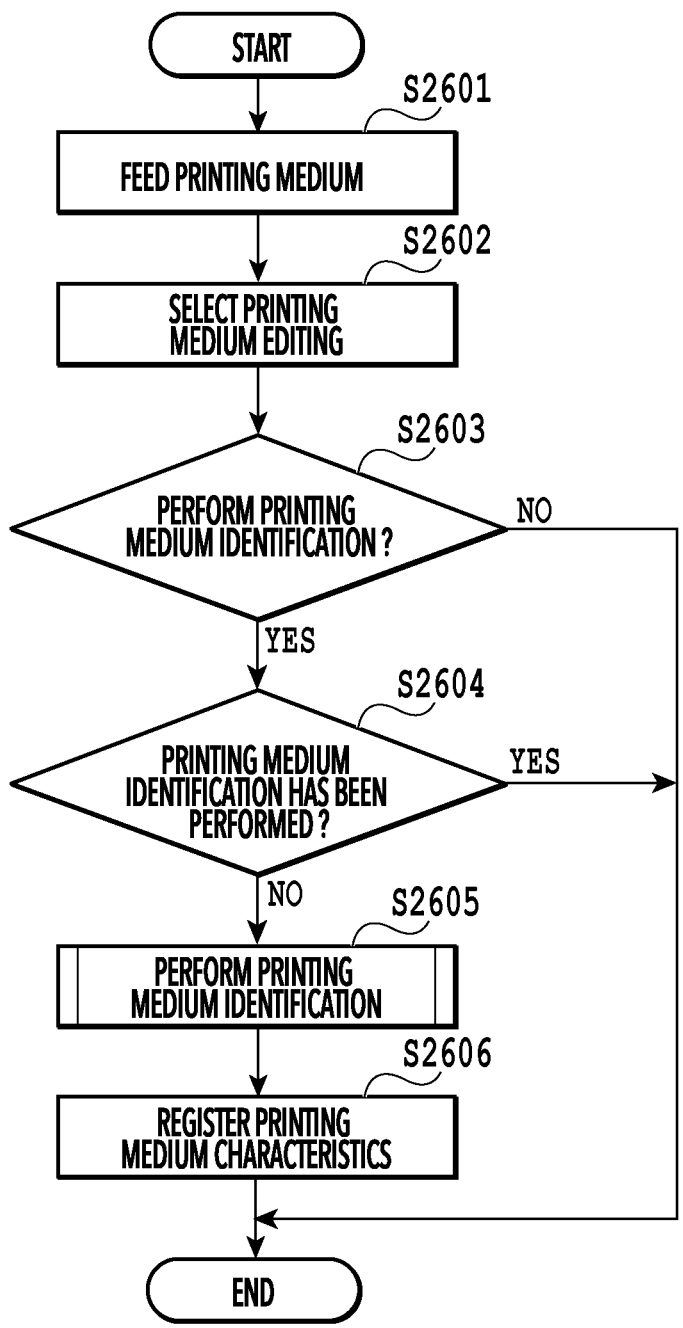
FIG. 26 is a flowchart illustrating a process of identifying and registering the ink fixation characteristics of a printing medium in a case where printing medium editing is selected according to the third embodiment.

FIG. 26 is a flowchart illustrating a process of identifying and registering the ink fixation characteristics of a printing medium according to the present embodiment, and is a flowchart being the series of processes illustrated in FIG. 24 to which is added a process of judging whether printing medium identification has or has not been performed. Steps S2601 to S2603 in FIG. 26 are the same as steps S2401 to S2403 in FIG. 24. Moreover, steps S2605 and S2606 in FIG. 26 are the same as steps S2404 and S2405 in FIG. 24 Also, step S2604 in FIG. 26 is the same as step S2506 in FIG. 25 and is a process of judging whether printing medium identification has been performed.

As described above, in a case where printing medium editing is selected, printing medium identification is kept from being repeated in a case where printing medium identification has already been performed on the printing medium. This eliminates the time that would otherwise be required for the printing medium identification as well as the costs of the printing medium and the inks that would otherwise be required due to the printing on the printing medium in the printing medium identification.

The present embodiment employs a configuration in which the information on whether printing medium identification has or has not been performed is used in combination with the wettability flag and the absorbency flag serving as information on the printing medium characteristics, but is not limited to this configuration. For example, a configuration may be employed in which a flag indicating whether printing medium identification has or has not been performed ("0" indicates that printing medium identification has not been performed, and "1" indicates that printing medium identification has been performed) is provided as a flag that is not used in combination with the information on the printing medium characteristics, and the information of this flag is used to judge whether printing medium identification has or has not been performed. Also, in the present embodiment, a configuration which automatically determines whether to perform printing medium identification (S2506, S2604) has been described, but the present embodiment is not limited to this configuration. Whether to perform printing medium identification may be determined based on the user's manual choice.

Fourth Embodiment

In a fourth embodiment, a description will be given of a configuration in which the printing conditions such as "amount of reaction liquid to be applied", "air blow during printing", and "mask" for the newly registered types of printing media listed in FIG. 23B can be manually and individually adjusted in printing medium editing.

The amount of the reaction liquid to be applied can be adjusted within an adjustment range of 0 to 100 at adjustment intervals of 1. The air blow during printing can be adjusted in four levels of off, low, middle, and high, allowing adjustments of the air blow strength, instead of simply off and on. The mask to be used in multipass printing can be selected between A and B.

FIG. 27 illustrates a table according to the present embodiment holding information on recommended conditions, specifically, combinations of "amount of reaction liquid to be applied", "air blow during printing", and "mask", associated with the combinations of wettability and ink absorbency of printing media.

FIG. 28A illustrates the result of applying the table of FIG. 27 to a printing medium identified as an easily wettable and non-absorbent printing medium by printing medium identification. FIG. 28B, on the other hand, illustrates printing conditions after the user manually and individually adjusted the amount of the reaction liquid to be applied and the air blow during printing in printing medium editing in order to reduce image problems originating from poor ink fixation or the like occurring due to the recommended conditions.

Figure 29:
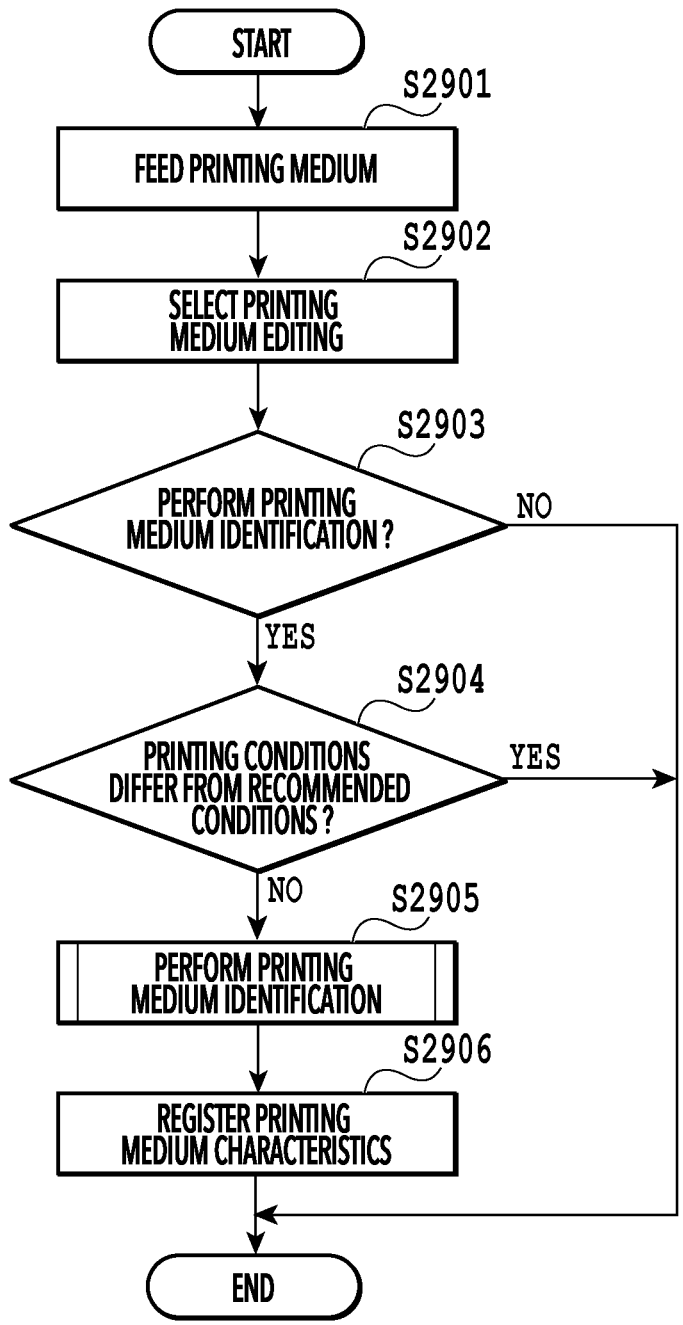
FIG. 29 is a flowchart illustrating a process of identifying and registering the ink fixation characteristics of a printing medium in a case where printing medium editing is selected according to a fourth embodiment.

FIG. 29 is a flowchart according to the present embodiment and is the series of processes illustrated in FIG. 24 to which is added a process of judging whether printing conditions for a printing medium differ from recommended conditions. Steps S2901 to S2903 in FIG. 29 are the same as steps S2401 to S2403 in FIG. 24. Moreover, steps S2905 and S2906 in FIG. 29 are similar processes to steps S2404 and S2405 in FIG. 24.

In step S2904, whether the printing conditions for the printing medium differ from the recommended conditions is judged. A specific example of the judgment in this step will be described below. First, using the table of FIG. 27, recommended conditions are obtained from the information on the printing medium characteristics such as the wettability and the ink absorbency registered in association with the printing medium. Assume that the recommended conditions listed in FIG. 28A are obtained. The obtained recommended conditions are compared with the printing conditions set for the printing medium. The conditions are different if there are individually adjusted printing conditions as listed in FIG. 28B. Then, in this case, the result of the judgment in step S2904 is "Yes", and the series of processes ends without updating the information on the printing conditions and printing medium characteristics of the printing medium. On the other hand, if the conditions do not differ, the result of the judgment in step S2904 is "No", and the process proceeds to S2905.

In the case where the printing conditions set for the printing medium are judged to not differ from the recommended conditions in step S2904, printing medium identification is performed in step S2905, and the information on the printing conditions and printing medium characteristics of the printing medium is updated. This ends the series of processes.

With the configuration described above, in a case where printing medium identification has already been performed based on a manual choice, printing conditions that reduce image problems owing to individual adjustments are prevented from returning to the recommended conditions.

A configuration in which whether printing conditions for a printing medium differ from recommended conditions is judged in printing medium editing has been described so far. Next, a description will be given of a configuration in which printing medium registration involves judging whether the printing conditions for the printing medium differ from recommended conditions, and not performing printing medium identification in a case where printing conditions different from the recommended conditions are set.

Figure 30:
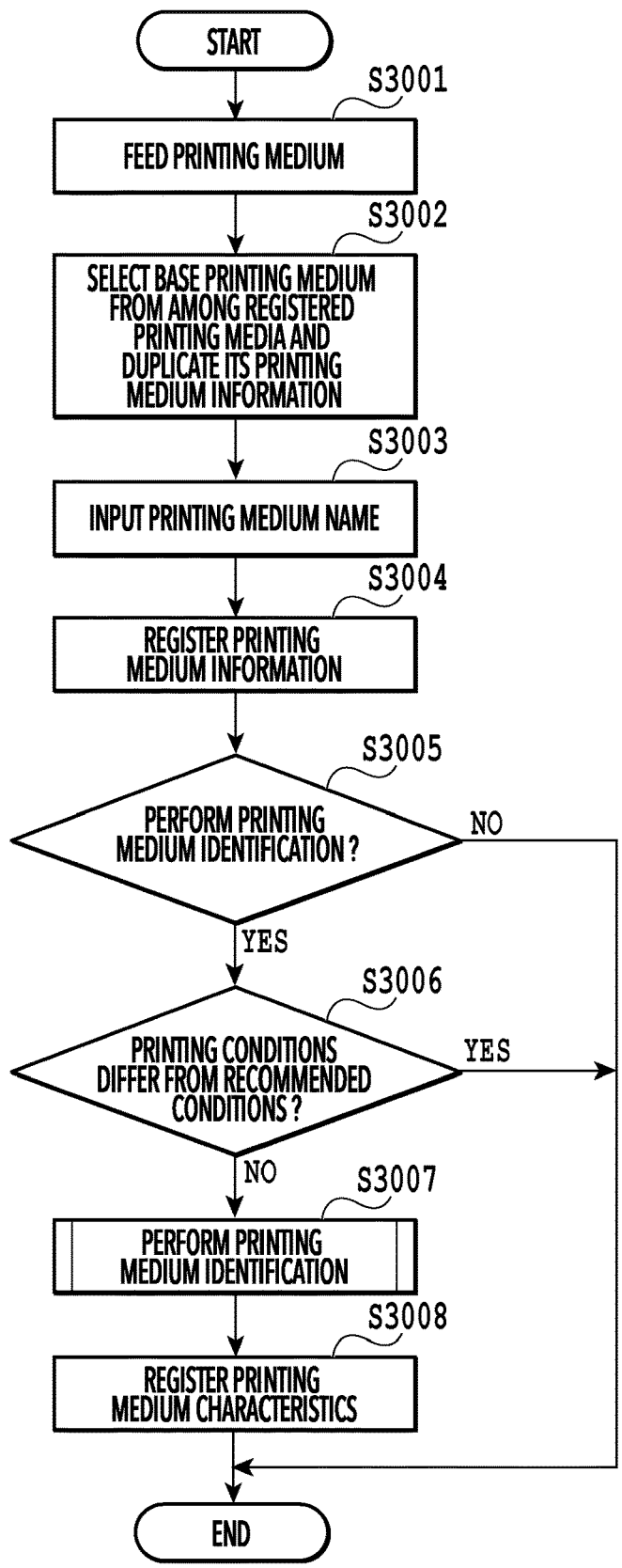
FIG. 30 is a flowchart illustrating a process of identifying and registering the ink fixation characteristics of a printing medium according to the fourth embodiment.

FIG. 30 is a flowchart illustrating a process of identifying and registering the ink fixation characteristics of a printing medium according to the present embodiment, and illustrates a flowchart being the series of processes illustrated in FIG. 22 to which is added a process of judging whether printing conditions for the printing medium differ from recommended conditions.

Steps S3001 to S3005 in FIG. 30 are the same as steps S2201 to S2205 in FIG. 22. Moreover, steps S2907 and S2908 in FIG. 30 are the same as steps S2406 and S2407 in FIG. 22.

In step S3006 in FIG. 30, which is the same as step S2904 in FIG. 29, it is judged whether the printing conditions for the printing medium differ from recommended conditions (that is, the printing conditions have been changed from the recommended conditions).

As described above, in the present embodiment, in printing medium registration, printing medium identification is not performed (YES in S3006) in a case where the printing conditions for the base printing medium are optimal printing conditions with less image problems obtained by individual adjustments. In this way, the base printing condition can be taken over. This prevents the base printing conditions from returning to the recommended conditions that cause image problems.

In the present embodiment, a configuration which automatically determines whether to perform printing medium identification has been described, but the present embodiment is not limited to this configuration. A configuration which determines whether to perform printing medium identification based on the user's manual choice can also achieve similar advantageous effects.

Other Embodiments

A description will be given below using a table in which the recommended conditions associated with the printing medium characteristics listed in FIGS. 23B and 27 which are provided in advance (combinations of "amount of reaction liquid to be applied", "air blow during printing", and "mask") are held for existing types of printing media registered in advance.

In some of the above embodiments, recommended conditions corresponding to combinations of wettability and ink absorbency of printing media as their printing medium characteristics (combinations of "amount of reaction liquid to be applied", "air blow during printing", and "mask") are set, but the embodiments are not limited to this case. In the registration of a new printing medium, the same recommended conditions as those for its base printing medium may be set for the new printing medium based on the type of the base printing medium regardless of the wettability and ink absorbency of the printing medium. For example, assume that, in the registration of a new printing medium, a poorly absorbent printing medium whose surface layer is made of a pulp material or a coating layer and therefore absorbs moisture at a low rate, such as "plain paper" or "wallpaper", is selected as the base printing medium. In this case, regardless of the wettability and ink absorbency of the printing medium, the printing condition "air blow during printing" is always set to the same recommended condition, which is "on", "low", "middle", or "high", for example. This prevents an image problem caused by contact between the print head and the printing medium caused by sheet floating due to cockling of the printing medium or another similar phenomenon regardless of the printing medium identification.

In the registration of a new printing medium, there is a possibility that printing medium identification may fail to be accurately done in a case where the printing medium is clear. Considering this possibility, printing medium identification may be skipped and the recommended conditions for the base printing medium selected for the new printing medium may be registered without updating them.

The printing conditions "amount of reaction liquid to be applied" and "air blow during printing" are set for the 8-pass printing operation using the pass mask A or B. However, the configuration is not limited to this one. A configuration in which different printing conditions can be set for each number of printing passes may be employed.

The present disclosure also includes a variation which involves adding a new number of printing passes in printing medium editing in addition to existing numbers of printing passes registered in advance. In this variation, recommended conditions may be set using a table holding pre-registered printing medium characteristics and printing conditions associated with these printing medium characteristics for each number of printing passes. In this table, the printing conditions "amount of reaction liquid to be applied", "air blow during printing", and "mask" are held in association with printing medium characteristics for each number of printing passes.

Moreover, a configuration in which "air blow during printing" is divided into "temperature of air blow during printing" and "volume of air blow during printing" that can be individually set may be employed.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present disclosure, it is possible to print a high-definition image with an inkjet printing apparatus even in a case of using a printing medium with unknown ink fixation characteristics.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2022-203761, filed Dec. 20, 2022, and No. 2023-148304, filed Sep. 13, 2023, which are hereby incorporated by reference wherein in their entirety.

What is claimed is:

1. A printing apparatus comprising:
a printing unit configured to print an image on a printing medium by applying a first liquid containing a colorant and a second liquid containing a component that causes the colorant to aggregate;
a control unit configured to control the printing unit so as to print a first pattern and a second pattern differing from the first pattern in a manner of application of the first liquid and the second liquid; and
an identification unit configured to identify a characteristic of the printing medium based on a first density of the first pattern and a second density of the second pattern.

2. The printing apparatus according to claim 1, wherein the characteristic of the printing medium is at least one of wettability and absorbency of the printing medium with the first liquid.

3. The printing apparatus according to claim 1, wherein an amount of the second liquid to be applied in the second pattern is different from an amount of the second liquid to be applied in the first pattern.

4. The printing apparatus according to claim 3, wherein an amount of the second liquid to be applied in the second pattern is larger than an amount of the second liquid to be applied in the first pattern.

5. The printing apparatus according to claim 4, wherein the amount of the second liquid to be applied in the first pattern is substantially zero.

6. The printing apparatus according to claim 1, wherein the second pattern is printed by applying the first liquid onto a region where the second liquid has been applied.

7. The printing apparatus according to claim 1, wherein a first time from application of the second liquid to application of the first liquid in the printing of the first pattern differs from a second time from application of the second liquid to application of the first liquid in the printing of the second pattern.

8. The printing apparatus according to claim 7, wherein
the printing unit is capable of applying the first liquid and the second liquid while the printing unit is scanned relative to the printing medium, and
the control unit controls the printing unit so as to apply the second liquid and then apply the first liquid in a same scan of the printing unit to thereby print the first pattern, and apply the first liquid in a scan following a scan for applying the second liquid to thereby print the second pattern.

9. The printing apparatus according to claim 2, wherein the identification unit identifies the characteristic as easily wettable in a case where the first density is higher than the second density, and identifies the characteristic as poorly wettable in a case where the first density is lower than the second density.

10. The printing apparatus according to claim 7, wherein the identification unit identifies the characteristic as non-absorbent in a case where a difference between the first density and the second density is within a predetermined range.

11. The printing apparatus according to claim 7, wherein the identification unit identifies the characteristic as poorly absorbent in a case where a difference between the first density and the second density is not within a predetermined range.

12. The printing apparatus according to claim 1, wherein the first pattern and the second pattern are printed adjacently to each other.

13. The printing apparatus according to claim 1, further comprising an optical sensor configured to obtain the first density and the second density.

14. The printing apparatus according to claim 1, further comprising a setting unit configured to set a printing condition based on a result of the identification by the identification unit.

15. The printing apparatus according to claim 14, wherein the setting unit sets a condition of air blow by an air blow unit as the printing condition, the air blow unit being configured to blow air toward portions of the printing medium to which the first liquid or the second liquid is applied from the printing unit.

16. The printing apparatus according to claim 14, wherein the setting unit sets an order of application of at least one of the first liquid or the second liquid from the printing unit in a scan as the printing condition.

17. The printing apparatus according to claim 14, wherein the setting unit sets an amount of the second liquid to be applied from the printing unit as the printing condition.

18. The printing apparatus according to claim 14, further comprising a storage unit configured to store characteristic information for each of printing media, the characteristic information being information reflecting the result of the identification by the identification unit.

19. The printing apparatus according to claim 18, wherein the setting unit sets a condition associated with the characteristic information as the printing condition.

20. The printing apparatus according to claim 19, further comprising: a change unit configured to change the printing condition set by the setting unit.

21. The printing apparatus according to claim 20, further comprising a judgment unit configured to judge whether to perform the identification of the characteristic by the identification unit, wherein
the judgment unit judges whether to perform the identification of the characteristic by the identification unit based on whether the printing condition for the printing medium differs from the condition associated with the characteristic information.

22. The printing apparatus according to claim 1, further comprising a judgment unit configured to judge whether to perform the identification of the characteristic by the identification unit.

23. The printing apparatus according to claim 22, further comprising a storage unit configured to store information on each of printing media indicating whether the identification of the characteristic by the identification unit has been performed on the printing medium.

24. The printing apparatus according to claim 23, wherein the judgment unit judges whether to perform the identification of the characteristic by the identification unit based on the information.

25. A printing apparatus comprising:
a printing unit configured to print an image on a printing medium by applying a first liquid containing a colorant and a second liquid containing a component that causes the colorant to aggregate; and
a control unit configured to control the printing unit so as to print a first pattern and a second pattern differing from the first pattern in a manner of application of the first liquid and the second liquid, wherein
the control unit controls the printing such that at least one of an amount of the second liquid to be applied, air blow to the printing medium during the printing, or ejection of the first liquid and the second liquid from the printing unit in a scan is made different between the first pattern and the second pattern based on a difference between a first density of the first pattern and a second density of the second pattern.

26. An identification method comprising:
printing a first pattern and a second pattern differing from the first pattern in a manner of application of a first liquid and a second liquid by using an application unit configured to apply the first liquid and the second liquid, the first liquid containing a colorant, the second liquid containing a component that causes the colorant to aggregate; and
identifying a characteristic of the printing medium based on a first density of the first pattern and a second density of the second pattern.

27. A printing apparatus comprising:
a printing unit configured to print an image on a printing medium by applying a first liquid containing a colorant and a second liquid containing a component that causes the colorant to aggregate;
a control unit configured to control the printing unit so as to print a first pattern and a second pattern, the first pattern being a pattern in which an amount of the first liquid to be applied is more than zero and an amount of the second liquid to be applied is substantially zero, the second pattern being a pattern in which an amount of the first liquid to be applied is more than zero and an amount of the second liquid to be applied is more than zero; and
an obtaining unit configured to obtain information on a density of the first pattern and a density of the second pattern from a user.

28. The printing apparatus according to claim 27, further comprising an identification unit configured to identify a characteristic of the printing medium based on the information.

29. The printing apparatus according to claim 27, further comprising a setting unit configured to set a printing condition for the printing medium based on the information.

* * * * *